United States Patent
Fujii et al.

(10) Patent No.: US 10,987,906 B2
(45) Date of Patent: Apr. 27, 2021

(54) MOLDING MATERIAL FOR MULTI-LAYERED STRUCTURE AND MOLDED ARTICLE OF MULTI-LAYERED STRUCTURE

(71) Applicant: Teijin Limited, Osaka (JP)

(72) Inventors: Takaya Fujii, Matsuyama (JP); Shuhei Suzuki, Matsuyama (JP); Hodaka Yokomizo, Matsuyama (JP); Hidenori Aoki, Matsuyama (JP)

(73) Assignee: Teijin Limited, Osaka (JP)

( * ) Notice: Subject to any disclaimer, the term of this patent is extended or adjusted under 35 U.S.C. 154(b) by 750 days.

(21) Appl. No.: 15/113,482

(22) PCT Filed: Jan. 19, 2015

(86) PCT No.: PCT/JP2015/051201
§ 371 (c)(1),
(2) Date: Jul. 22, 2016

(87) PCT Pub. No.: WO2015/115225
PCT Pub. Date: Aug. 6, 2015

(65) Prior Publication Data
US 2017/0008260 A1    Jan. 12, 2017

(30) Foreign Application Priority Data

Jan. 31, 2014 (JP) .............................. JP2014-017512

(51) Int. Cl.
*B32B 27/08* (2006.01)
*B32B 27/20* (2006.01)

(52) U.S. Cl.
CPC .............. *B32B 27/08* (2013.01); *B32B 27/20* (2013.01); *B32B 2262/106* (2013.01); *B32B 2605/00* (2013.01)

(58) Field of Classification Search
CPC ........ B29C 70/12; B29C 70/46; B29C 70/081; D04H 1/4242; D04H 1/72;
(Continued)

(56) References Cited

U.S. PATENT DOCUMENTS

| 7,445,836 B2 * | 11/2008 | Yamane | ............... B29C 70/081 |
| | | | 428/168 |
| 8,900,502 B2 * | 12/2014 | Taniguchi | .............. B29C 70/42 |
| | | | 264/257 |

(Continued)

FOREIGN PATENT DOCUMENTS

| JP | 2011-157524 A | 8/2011 |
| JP | 2011-189747 A | 9/2011 |

(Continued)

OTHER PUBLICATIONS

High Performance Polymers (Year: 2005).*
Difference between Thermosetting Resins and Thermoplastic Resins (https://www.osborneindustries.com/news/the-difference-between-thermoplastic-and-thermosetting-plastic/) May 2017.*
(Continued)

*Primary Examiner* — Maria V Ewald
*Assistant Examiner* — Daniel P Dillon
(74) *Attorney, Agent, or Firm* — Banner & Witcoff, Ltd.

(57) ABSTRACT

A molding material for a multi-layered structure, includes a thermoplastic resin layer (X) including carbon fibers (A) having a weight-average fiber length of 0.01 mm to less than 3 mm; and a thermoplastic resin layer (Y) including carbon fibers (B) having a weight-average fiber length of 3 mm to 100 mm, in which a density parameter $P_Y$ of the thermoplastic resin layer (Y) expressed by the following Equation (1) is $1 \times 10^2$ to less than $1 \times 10^4$, and in which a density parameter $P_X$ of the thermoplastic resin layer (X) expressed by the following Equation (1) is more than $1 \times 10^1$:

$$P = (q \times Ln^3)/h \qquad (1),$$

where q is the number of flow units of carbon fibers included in the thermoplastic resin layer per 1 mm² unit (Continued)

area, Ln is a number-average fiber length (mm) of the carbon fibers, and h is a thickness (mm) of the thermoplastic resin layer.

17 Claims, 11 Drawing Sheets

(58) Field of Classification Search
CPC . B29K 2105/0863; Y10T 428/30; H01B 1/04; H01B 1/24; B82Y 30/00; B82Y 10/00; B32B 5/26; B32B 2260/021; B32B 2262/106; B32B 27/12
USPC .......................................................... 428/30
See application file for complete search history.

(56) References Cited

U.S. PATENT DOCUMENTS

| | | | |
|---|---|---|---|
| 2009/0117366 A1* | 5/2009 | Honma | B29C 70/086 428/314.8 |
| 2015/0031257 A1 | 1/2015 | Ootsubo et al. | |

FOREIGN PATENT DOCUMENTS

| | | |
|---|---|---|
| JP | 2012-158846 A | 8/2012 |
| JP | 2012-158847 A | 8/2012 |
| JP | 2013-176984 A | 9/2013 |
| WO | 2013-094706 A1 | 6/2013 |

OTHER PUBLICATIONS

Apr. 7, 2015—International Search Report—Intl App PCT/JP2015/051201.

* cited by examiner

MOLDING MATERIAL FOR MULTI-LAYERED STRUCTURE AND MOLDED ARTICLE OF MULTI-LAYERED STRUCTURE

CROSS REFERENCE TO RELATED APPLICATIONS

This is a U.S. National Phase Application under 35 U.S.C. § 371 of International Application No. PCT/JP2015/051201, filed Jan. 19, 2015, which claims priority to Japanese Application 2014-017512, filed Jan. 31, 2014, and which was published Under PCT Article 21(2), the entire contents of which are incorporated herein by reference.

TECHNICAL FIELD

The present invention relates to a molding material having a multi-layered structure including thermoplastic resin layers having carbon fibers, and a molded article having the multi-layered structure.

BACKGROUND ART

In recent years, a random mat molded article has been proposed as one of fiber-reinforced composite materials. The random mat molded article is obtained by molding a random mat (for example, Patent Documents 1 to 3) in which a reinforcing fiber bundle having a given length and thermoplastic resin are mixed with each other.

In Patent Document 1 a random mat in which surface quality of a molded article after molding is excellent, or a random mat molded article with excellent surface quality is proposed. In Patent Document 2, a random mat or a random mat molded article, in which carbon fibers are easily impregnated with thermoplastic resin, is propsoed.

Further, Patent Document 3 proposes a random mat or a random mat molded article, which improves a flow characteristic during molding by using a carbon fiber bundle having two kinds of fiber lengths.

Additionally, Patent Documents 4 and 5 proposes a prepreg effective in molding a complex shape such as a rib or a boss, or a reinforcing fiber web with few pluckings and wrinkles on its surface, by using two kinds of reinforcing fibers having specific fiber lengths as composite materials using thermoplastic resin.

Patent Document 6 discloses a technique using two different kinds of molding materials in order to manufacture a molded article of a fiber-reinforced composite material capable of achieving both formation of a face plate portion excellent in surface appearance, dimensional accuracy and reliability and formation of a rib structure in press molding. In this technique, a molding material which has a long fiber length and a low flow characteristic and a molding material which has a short fiber length and a high flow characteristic are stacked and undergo press molding.

TECHNICAL DOCUMENTS OF RELATED ART

Patent Documents

[Patent Document 1] JP-A-2012-158846
[Patent Document 2] JP-A-2012-158847
[Patent Document 3] International Publication No. WO2013/094706
[Patent Document 4] JP-A-2011-157524
[Patent Document 5] JP-A-2011-189747
[Patent Document 6] JP-A-2013-176984

SUMMARY OF INVENTION

Problems to be Solved by Invention

If the random mat proposed in the above Patent Document 3 is used, a favorable flow characteristic is obtained during molding, but there is a problem in that molding pressure is relatively high. In a case of the random mat requiring such a relatively high molding pressure, a technique capable of performing molding with a small facility is necessary in molding a molded article with a large area.

In the molding method proposed in the above Patent Document 6, it is necessary to use about 50 wt % or higher of a molding material in which a fiber length is shortened so that a flow characteristic is improved, with respect to the total molding material weight, and thus it is hard to satisfy both a flow characteristic and mechanical strength. In addition, it has been found that a problem occurs in which, since a flow characteristic of an inner layer is much higher than those of an outer layer, in a case where ends of the respective layers are aligned, and thus an article is molded, most of the inner layer protrudes out of the end of the outer layer, and thus the mechanical strength at the molded article end is lowered.

An object of the present invention is to provide a molding material and a molded article capable of obtaining a favorable flow characteristic and developing favorable mechanical characteristics even in a case where molding is performed under severe molding conditions in light of improvement of the flow characteristic during molding when molding pressure is low.

Means for Solving the Problems

The present inventors have made assiduous investigations for solving the above-mentioned problems, and, as a result, have found the following means and thus have reached the present invention.

<1>

According to an aspect of the invention, there is provided a molding material for a multi-layered structure, including: a thermoplastic resin layer (X) including carbon fibers (A) having a weight-average fiber length of 0.01 mm to less than 3 mm; and a thermoplastic resin layer (Y) including carbon fibers (B) having a weight-average fiber length of 3 mm to 100 mm, in which a density parameter $P_Y$ of the thermoplastic resin layer (Y) expressed by the following Equation (1) is $1 \times 10^2$ to less than $1 \times 10^4$, and in which a density parameter $P_X$ of the thermoplastic resin layer (X) expressed by the following Equation (1) is more than $1 \times 10^1$:

$$P = (q \times Ln^3)/h \qquad (1),$$

where q is the number of flow units of carbon fibers included in the thermoplastic resin layer per 1 mm² unit area;

Ln is a number-average fiber length (mm) of the carbon fibers; and

H is a thickness (mm) of the thermoplastic resin layer.

<2>

In the molding material for a multi-layered structure according to <1>, a ratio ($P_X/P_Y$) of the density parameter $P_X$ of the thermoplastic resin layer (X) to the density parameter $P_Y$ of the thermoplastic resin layer (Y) is $1.0 \times 10^{-3}$ to 3.0.

<3>
In the molding material for a multi-layered structure according to <1> or <2>, a weight proportion of the thermoplastic resin layer (X) to a total weight of the thermoplastic resin layer (X) and the thermoplastic resin layer (Y) is 5 wt % to 40 wt %.
<4>
In the molding material for a multi-layered structure according to any one of <1> to <3>, the thermoplastic resin layer (Y) is disposed in an outermost layer on at least one side of a multi-layered structure.
<5>
In the molding material for a multi-layered structure according to any one of <1> to <4>, the thermoplastic resin layer (X) is disposed at a center in at least a stacking direction.
<6>
In the molding material for a multi-layered structure according to <5>, the thermoplastic resin layer (X) is a single layer, and the thermoplastic resin layer (Y) is of two layers.
<7>
In the molding material for a multi-layered structure according to any one of <1> to <6>, the carbon fibers (B) included in the thermoplastic resin layer (Y) are randomly oriented in two-dimensional directions.
<8>
In the molding material for a multi-layered structure according to any one of <1> to <7>, the carbon fibers (B) included in the thermoplastic resin layer (Y) include a carbon fiber bundle (Bb) constituted by single fibers of a critical number of single fiber or more, defined by the following Equation (2), a proportion of the carbon fiber bundle (Bb) to a total amount of the carbon fibers (B) is more than 0 Vol % and less than 99 Vol %, and an average number ($N_B$) of fibers in the carbon fiber bundle (Bb) satisfies the following Expression (3):

$$\text{Critical number of single fiber} = 600/D_B \quad (2)$$

$$0.7 \times 10^4 / D_B^2 < N_B < 6 \times 10^5 / D_B^2 \quad (3)$$

where $D_B$ is an average fiber diameter (μm) of the carbon fibers (B).
<9>
According to another aspect of the invention, there is provided a molded article of a multi-layered structure, molded by molding a molding material, in which the molding material is the molding material according to any one of <1> to <8>.
<10>
In the molded article of a multi-layered structure according to <9>, the thermoplastic resin layer (Y) is present at an end of the molded article.
<11>
In the molded article of a multi-layered structure according to <9> or <10>, the multi-layered structure is a structure having a molding layer of the thermoplastic resin layer (Y) located in an outermost layer on at least one side, and a molding layer of the thermoplastic resin layer (X) adjacent to the molding layer of the thermoplastic resin layer (Y), and
    a protrusion portion is provided on a surface of the molding layer of the thermoplastic resin layer (Y), and a part of the molding layer of the thermoplastic resin layer (X) pushes up the molding layer of the thermoplastic resin layer (Y) at the protrusion portion in a direction in which the protrusion portion protrudes.

<12>
In the molded article of a multi-layered structure according to <9> or <10>, the multi-layered structure is a structure having a molding layer of the thermoplastic resin layer (Y) located in an outermost layer on at least one side, and a molding layer of the thermoplastic resin layer (X) adjacent to the molding layer of the thermoplastic resin layer (Y), and
    a protrusion portion is provided on a surface of the molding layer of the thermoplastic resin layer (Y), and a part of the molding layer of the thermoplastic resin layer (X) breaks through the molding layer of the thermoplastic resin layer (Y) at the protrusion portion in a direction in which the protrusion portion protrudes.

In addition, "(A)" in the carbon fibers (A) and "(B)" in the carbon fibers (B) are written in order to differentiate both of the carbon fibers from each other. Similarly, "(X)" in the thermoplastic resin layer (X) and "(Y)" in the thermoplastic resin layer (Y) are written in order to differentiate both of the thermoplastic resin layers from each other.

Advantageous Effects of Invention

In a molding material related to the present invention, since a weight-average fiber length of the carbon fibers (A) of the thermoplastic resin layer (X) is short, the flow characteristic during molding is improved, and since a weight-average fiber length of the carbon fibers (B) of the thermoplastic resin layer (Y) is long, the flow characteristic during molding and development of mechanical characteristics when formed as a molded article are compatible with each other.

EMBODIMENTS FOR CARRYING OUT INVENTION

Figure 1:
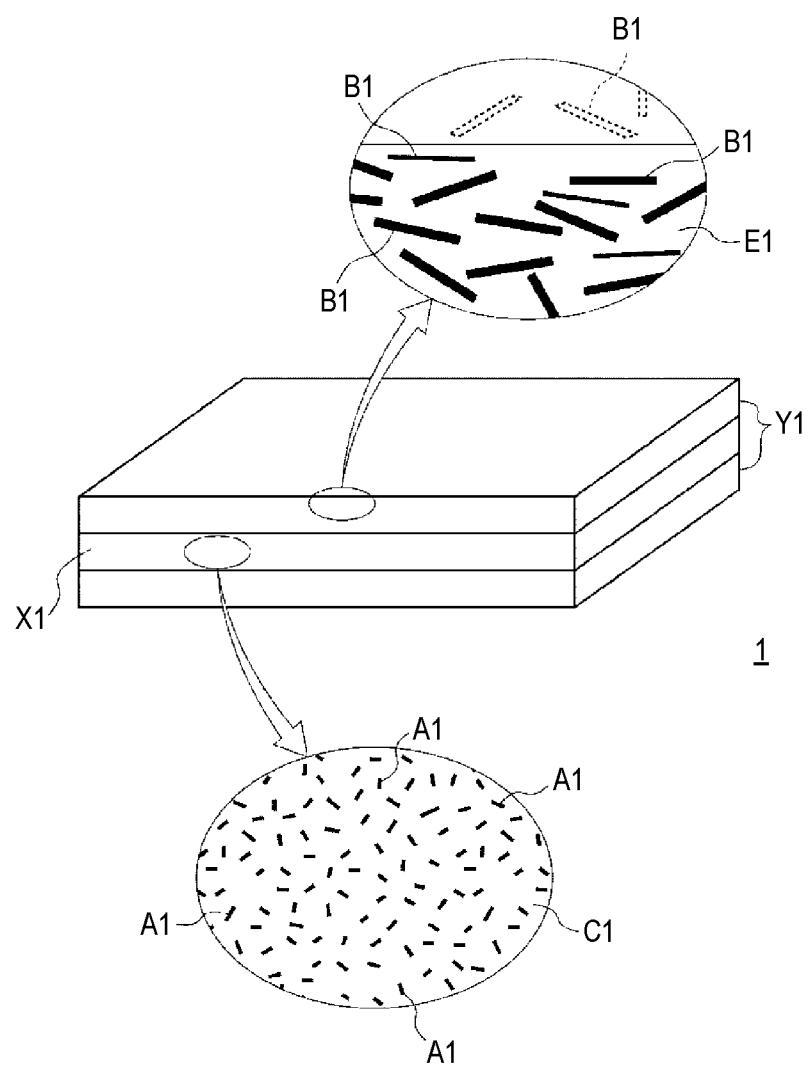
FIG. 1 is a schematic diagram illustrating a configuration of a molding material for a three-layered structure which is an example of an embodiment.

Hereinafter, when the present invention is described, the reference numeral is added with a parenthesis, and when an embodiment which is an example of the present invention is described, the reference numeral is not added with the parenthesis.

1. Configuration (1) Entire Configuration

A molding material related to the present invention has a multi-layered structure including a thermoplastic resin layer (X) and a thermoplastic resin layer (Y).

Figure 2:
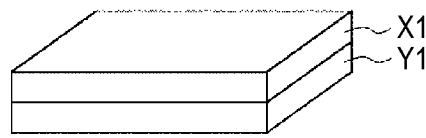
FIG. 2 is a schematic diagram illustrating a configuration of a molding material for a two-layered structure which is an example of an embodiment.
Figure 3:
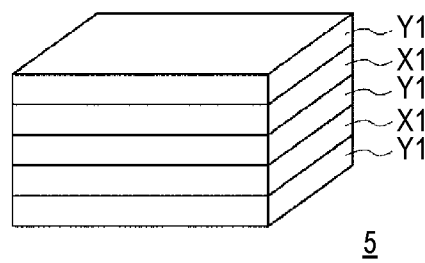
FIG. 3 is a schematic diagram illustrating a configuration of a molding material for a five-layered structure which is an example of an embodiment.

As illustrated in FIG. 1, a molding material 1 related to an embodiment which is an example has a three-layered structure in which a thermoplastic resin layer X1 is sandwiched between two thermoplastic resin layers Y1. As illustrated in FIG. 2, a molding material 3 which is another example has a two-layered structure of a thermoplastic resin layer X1 and a thermoplastic resin layer Y1. As illustrated in FIG. 3, a molding material 5 which is still another example has a five-layered structure in which two thermoplastic resin layers X1 and three thermoplastic resin layers Y1 are alternately disposed.

Here, the thermoplastic resin layer X1 is an example of a "thermoplastic resin layer (X)", and the thermoplastic resin layer Y1 is an example of a "thermoplastic resin layer (Y)" of the present invention.

The multi-layered structure may be a structure in which the thermoplastic resin layer X1 is located in the outermost layer on at least one side of the molding material, and may be a structure in which the thermoplastic resin layer X1 is located in an intermediate layer of the molding material. The intermediate layer is a layer which is not the outermost layer (also referred to as a front layer) on a front surface side of the molding material or the outermost layer (also referred to as a rear layer) on a rear surface side, and is a layer which is not exhibited in the front layer and the rear layer except for side surfaces.

The thermoplastic resin layer X1 includes carbon fibers A1 having a weight-average fiber length of 0.01 mm to less than 3 mm, and a thermoplastic resin C1. Here, the carbon fibers A1 are an example of "carbon fibers (A)" of the present invention. The thermoplastic resin layer Y1 includes carbon fibers B1 having a weight-average fiber length of 3 mm to 100 mm, and a thermoplastic resin E1. Here, the carbon fibers B1 are an example of "carbon fibers (B)" of the present invention.

(2) Thermoplastic Resin Layer (X)

The thermoplastic resin layer (X) includes carbon fibers (A1) having a weight-average fiber length of 0.01 mm to less than 3 mm, and a thermoplastic resin material (C).

(2-1) Fiber Length

In the carbon fibers (A), a fiber length may be constant, and a fiber length may not be constant as illustrated in the enlarged view of FIG. 1.

The carbon fibers (A) are not particularly limited as long as a weight-average fiber length ($Lw_A$) is within a range from 0.01 mm to less than 3 mm, but a number-average fiber length ($Ln_A$) of the carbon fibers (A) is preferably within a range from 0.01 mm to less than 3 mm.

(2-1-1) Calculation of Average Fiber Length

Generally, when a fiber length of each carbon fiber is indicated by Li, a number-average fiber length (Ln) and a weight-average fiber length (Lw) in each thermoplastic resin layer are obtained by using the following Equations (4) and (5).

$$Ln = \Sigma Li/j \quad (4)$$

$$Lw = (\Sigma Li^2)/(\Sigma Li) \quad (5)$$

Here, "j" indicates the number of measured carbon fibers.

(2-1-2) Range of Weight-Average Fiber Length

If the weight-average fiber length ($Lw_A$) of the carbon fibers (A) is less than 3 mm, a flow characteristic of the thermoplastic resin (C) during molding is improved, and thus the flow characteristic of the molding material is improved. If the weight-average fiber length ($Lw_A$) is equal to or more than 0.01 mm, it is easy to ensure mechanical properties of a molded article which is obtained by molding the molding material.

A lower limit of the weight-average fiber length ($Lw_A$) of the carbon fibers (A) is preferably equal to or more than 0.1 mm, and is more preferably equal to or more than 0.2 mm, from the viewpoint of mechanical properties of a molded article. On the other hand, an upper limit thereof is preferably equal to or less than 2.5 mm, and is more preferably equal to or less than 2 mm, from the viewpoint of flow characteristic.

(2-2) Fiber Volume Fraction

A fiber volume fraction ($Vf_A$), generally defined by the following Equation (6), of the carbon fibers (A) in the thermoplastic resin layer (X) is preferably within a range from 5 Vol % to 80 Vol %, more preferably within a range from 20 Vol % to 60 Vol %, and even more preferably within a range from 30 Vol % to 40 Vol %.

$$Vf = 100 \times (\text{volume of carbon fibers})/(\text{volume of carbon fibers} + \text{volume of thermoplastic resin}) \quad (6)$$

If the fiber volume fraction ($Vf_A$) is equal to or more than 5 Vol %, an effect caused by the layer structure is easily developed, and the thermoplastic resin layer (X) easily flows toward the thermoplastic resin layer (Y) side. As a result, when a rib or a boss is formed, the carbon fibers (A) easily enter the rib or the boss. If the fiber volume fraction ($Vf_A$) is equal to or less than 80 Vol %, flowability of the carbon fibers (A) becomes better, and thus a flow characteristic of the molding material is improved.

(2-3) Fiber State

The carbon fibers (A) may be constituted by single fibers, may be constituted by both of a fiber bundle, which is a bundle of a plurality of fibers, and single fibers, and may constituted by only a fiber bundle.

The single fiber includes a fiber showing not only a state in which single fibers of the carbon fibers (A) are completely separated but also a state in which some fibers are bonded to each other but most of the fibers are separated.

(2-4) Kind of Carbon Fiber

As the carbon fiber (A), generally, a polyacrylonitrile (PAN) based carbon fiber, a petroleum and coal pitch-based carbon fiber, a rayon-based carbon fiber, a cellulose-based carbon fiber, a lignin-based carbon fiber, a phenol-based carbon fiber, and a vapor-grown carbon fiber are known, and any one thereof may be appropriately used. Above all, the polyacrylonitrile (PAN) based carbon fiber is preferably used.

(2-5) Kind of Thermoplastic Resin Material

Although not particularly limited, the thermoplastic resin material (C) may include polyolefin resins, polystyrene resins, thermoplastic polyamide resins, polyester resins, polyacetal resins (polyoxymethylene resins), polycarbonate resins, (meth)acrylic resins, polyarylate resins, polyphenylene ether resins, polyimide resins, polyether nitrile resins, phenoxy resins, polyphenylene sulfide resins, polysulfone resins, polyketone resins, polyether ketone resins, thermoplastic urethane resins, fluorine resins, thermoplastic polybenzimidazole resins, and the like.

The polyolefin resins may include, for example, a polyethylene resin, a polypropylene resin, a polybutadiene resin, a polymethyl pentene resin, a vinyl chloride resin, a vinylidene chloride resin, a vinyl acetate resin, and a polyvinyl alcohol resin.

The polystyrene resins may include, for example, a polystyrene resin, an acrylonitrilestyrene resin (AS resin), and an acrylonitrile-butadiene-styrene resin (ABS resin).

The polyamide resins may include, for example, polyamide 6 resin (nylon 6), polyamide 11 resin (nylon 11), polyamide 12 resin (nylon 12), polyamide 46 resin (nylon 46), polyamide 66 resin (nylon 66), and polyamide 610 resin (nylon 610).

The polyester resins may include, for example, a polyethylene terephthalate resin, a polyethylene naphthalate resin, a polyethylene butylene terephthalate resin, a polytrimethylene terephthalate resin, and liquid crystal polyester.

The (meth)acrylic resins may include, for example, polymethylmethacrylate.

The polyphenylene ether resins may include, for example, modified polyphenylene ether.

The polyimide resins may include, for example, thermoplastic polyimide, a polyamide-imide resin, and a polyether-imide resin.

The polysulfone resins may include, for example, a modified polysulfone resin, and a polyether sulfone resin.

The polyether ketone resins may include, for example, a polyether ketone resin, a polyether ether ketone resin, and a polyether ketone ketone resin, and the fluorine resins may include, for example, polytetrafluoroethylene.

Thermoplastic resins used as the thermoplastic resin material (C) may be of only one kind, may be of two or more kinds. Aspects of using two or more kinds of thermoplastic resins together, for example, there is an aspect of using thermoplastic resins having different softening points or melting points together, or an aspect of using thermoplastic resins having different average molecular weights together, but the present invention is not limited thereto.

(3) Thermoplastic Resin Layer (Y)

The thermoplastic resin layer (Y) includes carbon fibers (B) having a weight-average fiber length of 3 mm to 100 mm, and a thermoplastic resin material (E).

(3-1) Thermoplastic Resin (E)

The thermoplastic resin (E) in the thermoplastic resin layer (Y) is preferably the same as described in the thermoplastic resin (C) in the thermoplastic resin layer (X), and has the same material as that of the thermoplastic resin (C) in the thermoplastic resin layer (X). The "same material" mentioned here indicates that at least main components of the thermoplastic resin (C) in the thermoplastic resin layer (X) and the thermoplastic resin (E) in the thermoplastic resin layer (Y) are the same as each other.

(3-2) Carbon Fiber (B)

(3-2-1) Weight-Average Fiber Length

The carbon fibers (B) have a weight-average fiber length $(Lw_B)$ longer than that of the carbon fibers (A). Thus, mechanical properties (particularly, fatigue strength) are ensured, but, if the weight-average fiber length $(Lw_B)$ exceeds 100 mm, a flow characteristic is deteriorated. If the weight-average fiber length $(Lw_B)$ is less than 3 mm, mechanical properties of a molded article obtained by molding a molding material are not sufficient.

The weight-average fiber length $(Lw_B)$ of the carbon fibers (B) is not particularly limited within a range from 3 mm to 100 mm. A fiber length may be of only one kind, and may be of a plurality of kinds. For example, there may be two kinds of fiber lengths such as 5 mm and 50 mm.

The number-average fiber length $(Ln_B)$ and the weight-average fiber length $(Lw_B)$ of the carbon fibers (B) are obtained according to the above Equations (4) and (5).

A lower limit of the weight-average fiber length $(Lw_B)$ of the carbon fibers (B) is preferably equal to or more than 5 mm, more preferably equal to or more than 10 mm, and even more preferably equal to or more than 15 mm, from the viewpoint of mechanical properties of a molded article. On the other hand, an upper limit thereof is preferably equal to or less than 80 mm, more preferably equal to or less than 50 mm, and even more preferably equal to or less than 30 mm, from the viewpoint of flow characteristic during molding.

A method of setting a weight-average fiber length to such values is not particularly limited, but, in a preferred method of manufacturing a molding material, which will be described later, there may be a method of adjusting a pitch of a blade which cuts a strand of a plurality of carbon fiber bundles. A plurality of blades with changed pitches may be used, or a rotary cutter in which a pitch of blades is continuously changed may be used, in order to cut fibers by continuously changing fiber lengths.

(3-2-2) Fiber State

The carbon fibers (B) may be constituted by single fibers, may be constituted by fiber bundles with the number which is smaller than a critical number of single fiber which will be described later, and a single fibers, may be constituted by fiber bundles with the number which is equal to or larger than a critical number of single fiber, and single fibers, may be constituted by fiber bundles with the number which is smaller than a critical number of single fiber, fiber bundles with the number which is equal to or larger than a critical number of single fiber, and single fibers, may be constituted by fiber bundles with the number which is smaller than a critical number of single fiber, and may be constituted by fiber bundles with the number which is equal to or larger than a critical number of single fiber.

(3-2-3) Form of Carbon Fiber

A fiber state of the carbon fibers (B) is not particularly limited as described above, but, in a case where a fiber bundle is included, the number of single fiber forming each fiber bundle may be almost uniform or differs in each fiber bundle.

In a case where a fiber bundle is included as the carbon fibers (B), the carbon fibers (B) preferably satisfy the following i) to iii).

i) Fiber bundles which are less than a critical number of single fiber, defined by the following Equation (2), and a single fiber (these are referred to as "single fiber and the like" for convenience and are indicated by the reference sign "Ba"), and carbon fiber bundles which are equal to or more than the critical number of single fiber and a single fiber (indicated by the reference sign "Bb" so as to be differentiated from the fiber bundles which are less than the critical number of single fiber) are present together.

ii) A proportion of the carbon fiber bundle (Bb) to the total amount of carbon fibers (B) included in the thermoplastic resin layer (Y) is more than 0 Vol % and less than 99 Vol %.

iii) An average number ($N_B$) of fibers in the carbon fiber bundle (Bb) satisfies the following Expression (3).

$$\text{Critical number of single fiber} = 600/D_B \quad (2)$$

$$0.7 \times 10^4/D_B^2 < N_B < 6 \times 10^5/D_B^2 \quad (3)$$

$D_B$ indicates an average fiber diameter (μm) of the carbon fibers (B), and, more accurately, is a diameter of a single fiber forming the carbon fibers.

(3-2-3-1) Proportion of Carbon Fiber Bundle (Bb)

A proportion of the carbon fiber bundle (Bb) to the total amount of carbon fibers (B) is preferably within a range from more than 0 Vol % to less than 99 Vol % described above, more preferably within a range from 20 Vol % to less than 99 Vol %, even more preferably within a range from 30 Vol % to less than 95 Vol %, and still more preferably within a range from 50 Vol % to less than 90 Vol %.

As mentioned above, if the carbon fiber bundle (Bb) and the other single fiber and the like (Ba) coexist within the range of the specific proportion, an amount of carbon fibers (B) in a molding material, that is, the fiber volume fraction ($Vf_B$) of the carbon fibers (B) can be increased.

If the proportion of carbon fiber bundle (Bb) to the whole amount of carbon fibers (B) is increased, the single fiber and the like (Ba) are reduced, entanglement between the carbon fibers (B) is reduced, a flow characteristic is improved, and thus it is possible to easily obtain a thin-walled molded article.

If the proportion of carbon fiber bundle (Bb) is less than 99 Vol %, it is possible to easily obtain a molding material with excellent mechanical properties when a molded article is formed.

(3-2-3-2) Average Number ($N_B$) of Fibers

The average number ($N_B$) of fibers of the carbon fiber bundle (Bb) is set as appropriate within a range of not damaging a flow characteristic and mechanical characteristics, and is not particularly limited. The average number ($N_B$) of fibers of the carbon fiber bundle (Bb) is typically from more than 1 to 12000 in a bundle form, but preferably satisfies the Expression (3), is more preferably less than $3 \times 10^5/D_B^2$, and is even more preferably less than $6 \times 10^4/D_B^2$. Opening of the carbon fiber bundle (Bb) will be described later.

(3-2-3-3) Examples

Specifically, in a case where the average fiber diameter ($D_B$) of the carbon fibers (B) is more than 5 μm and less than 7 μm, a critical number of single fiber is more than 86 and less than 120.

In a case where the average fiber diameter ($D_B$) of the carbon fibers (B) is 5 μm, the average number ($N_B$) of fibers of the carbon fiber bundle (Bb) is within a range from more than 280 to less than 24000, but, above all, preferably within a range from more than 280 to less than 12000, more preferably within a range from more than 280 to less than 4000, even more preferably within a range from more than 600 to less than 2500, and still more preferably within a range from more than 600 to less than 1600.

In a case where the average fiber diameter ($D_B$) of the carbon fibers (B) is 7 μm, the average number ($N_B$) of fibers of the carbon fiber bundle (Bb) is within a range from more than 142 to less than 12244, but, above all, preferably within a range from more than 142 to less than 6122, more preferably within a range from more than 300 to less than 1500, and even more preferably within a range from more than 300 to less than 800.

In addition, fiber lengths of the single fiber and the like (Ba) including fiber bundles which are less than the critical number of single fiber and a single fiber, and fiber lengths of the carbon fiber bundles (Bb) which are more than the critical number of single fiber may be substantially the same as each other (of a single kind), and a plurality of kinds of fibers may be present with the same fiber length. Further, fiber lengths of the carbon fiber bundle (Bb) may be different from fiber lengths of the single fiber and the like.

(3-2-4) Orientation of Fibers

The carbon fibers (B) may be randomly oriented in two-dimensional directions as directions (orientation angles) of the fibers. This indicates that an orientation of the carbon fibers in a specific direction in a plane is not greatly different from an orientation in the other direction.

Regarding the random orientation in the two-dimensional direction, a random orientation of the carbon fibers included in the thermoplastic resin layer (Y) can be quantitatively evaluated by obtaining a ratio between tensile moduli of the plate-like thermoplastic resin layer (Y) in two directions orthogonal to each other. When a ratio obtained by dividing a larger value of values of the moduli of the thermoplastic resin layer (Y) in the two directions by a smaller value is equal to or less than 3, the carbon fibers (B) are said to be randomly oriented in the two-dimensional directions. Particularly, if the ratio is equal to or less than 2, the random orientation in the two-dimensional directions is excellent. If the ratio is equal to or less than 1.3, the random orientation in the two-dimensional directions is more excellent.

(3-2-5) Fiber Volume Fraction

The fiber volume fraction ($Vf_B$), defined in the above Equation (6), of the carbon fibers (B) in the thermoplastic resin layer (Y) is preferably within a range from 5 Vol % to 80 Vol %, more preferably within a range from 20 Vol % to less than 60 Vol %, and even more preferably within a range from 25 Vol % to 45 Vol %.

If the fiber volume fraction ($Vf_B$) is equal to or more than 5 Vol %, the mechanical properties become favorable, and if the fiber volume fraction is equal to or less than 80 Vol %, the flow characteristic is improved.

(3-2-6) Kind of Carbon Fiber

As the carbon fibers (B), the same carbon fibers as described in the above carbon fibers (A) may be used.

(4) Multi-Layered Structure (4-1) Layer Configuration

Hereinafter, a description will be made of a multi-layered structure of the thermoplastic resin layers (X) and (Y) forming a molding material. When a stacked configuration is represented, the thermoplastic resin layer (X) is represented as an X layer, and the thermoplastic resin layer (Y) is represented as a Y layer. For example, in a case of the molding material 1 illustrated in FIG. 1, the molding material has a three-layered structure in which the thermoplastic resin layer (X) is sandwiched between the thermoplastic resin layers (Y), and is represented as "Y/X/Y layers".

(4-1-1) Multi-Layered Structure

A layer configuration of the thermoplastic resin layer (X) and the thermoplastic resin layer (Y) is not particularly limited, and, for example, a molding material may have multi-layered structures such as X/Y layers (molding material 3), Y/X/Y layers, Y/X/Y/X layers, and Y/X/Y/X/Y layers (molding material 5), and X/Y/X/Y/X layers. Needless to say, other multi-layered structures not described here may be employed.

In the multi-layered structure, in a case where the thermoplastic resin layer (X) forms a front layer on either side of a molding material, and a rib or a boss is formed on the front layer according to a cold press method, cooling occurs from a surface of the thermoplastic resin layer (X), but a weight-average fiber length of the carbon fibers (A) in the thermoplastic resin layer (X) is short, and thus the carbon fibers more easily flow than in the thermoplastic resin layer (Y), and the rib or the boss can be formed. In this case, since the weight-average fiber length of the carbon fibers (A) is short, and the carbon fibers easily flow, surface appearance of a molded article is improved more than in a case where the thermoplastic resin layer (Y) forms an outside layer (front surface).

From the viewpoint of maintaining mechanical properties of a molded article, particularly, bending characteristics, the thermoplastic resin layer (Y) is preferably disposed in the outermost layer on at least one side, and a layer structure is preferable in which the thermoplastic resin layer (X) is disposed at the center in at least a stacking direction. A structure is more preferable in which the thermoplastic resin layer (X) is disposed as an inner layer adjacent to the outermost thermoplastic resin layer (Y) directly thereunder.

(4-1-2) Three-Layered Structure

From the viewpoint of manufacturing, a multi-layered structure is more preferably Y/X/Y layers of one thermoplastic resin layer (X) and two thermoplastic resin layers (Y). In other words, the molding material 1 has a three-layered structure which is formed of one thermoplastic resin layer (X) and two thermoplastic resin layers (Y), and in which the thermoplastic resin layer (X) is interposed between the thermoplastic resin layers (Y). In other words, the thermoplastic resin layer (X) is preferably disposed at the center in the stacking direction. The stacking direction matches a thickness direction of the molding material 1.

The molding material may have a three-layered structure in which one thermoplastic resin layer (Y) is interposed between two thermoplastic resin layers (X), inversely to the above-described stacked configuration. In this case, the thermoplastic resin layer (X) is located in a front layer and a rear layer of the molding material, and thus surface appearance characteristics of a molded article after molding are improved.

Also when a rib or a boss is provided on at least one of a front surface and a rear surface, the front surface and the rear surface are constituted by the thermoplastic resin layers (X), and thus it is possible to obtain a favorable rib or boss with which a resin material is sufficiently filled.

In a case of the three-layered structure, it is preferable that stacking patterns in the thickness direction are symmetric to each other with respect to a virtual plane which passes through the center in the thickness direction and is parallel to a principal surface (a surface orthogonal to the thickness direction) of the molding material. Consequently, it is possible to reduce warpage of a molded article obtained by molding the molding material.

(4-1-3) Other Layers

The molding material may have one or more thermoplastic resin layers (X) and one or more thermoplastic resin layers (Y), and may have other thermoplastic resin layers. As the other thermoplastic resin layers, for example, there are a layer including a reinforcing fiber other than a carbon fiber, a layer including a carbon fiber of a weight-average fiber length of more than 100 mm (for example, a consecutive fiber), and a layer in which the thermoplastic resin layer (X) and the thermoplastic resin layer (Y) are mixed into one layer.

(4-2) Flow Characteristic

In a molding material in which the thermoplastic resin layer (X) and the thermoplastic resin layer (Y) are stacked, the flow characteristic is improved as a proportion of the thermoplastic resin layer (X) to the whole material (molding material) increases, for example, in cold press molding.

In the cold press method, a heated molding material is disposed in a mold whose temperature is lower than the temperature of the molding material, and then the mold is pressed (the mold is clamped) at predetermined pressure. Thus, for example, in a case where the thermoplastic resin layers (Y) are provided in both of the outermost layers in the stacking (thickness) direction of the molding material (the molding material 1 illustrated in FIG. 1 is an example thereof), the heated molding material is cooled from portions in contact with the mold, that is, the thermoplastic resin layers (Y) present in the front outermost layer (front surface) and the rear outermost layer (rear surface) of the molding material. If the front surface and the rear surface of the molding material are cooled, generally, the viscosities of the resin materials on the front surface and the rear surface are reduced, and thus it is difficult to form a rib or a boss, or high pressure is necessary in order to form the rib or the boss.

However, the thermoplastic resin layer (X) includes the carbon fibers (A) having a weight-average fiber length shorter than a weight-average fiber length of the carbon fibers (B) included in the thermoplastic resin layer (Y). The thermoplastic resin layer (X) flows more easily than the thermoplastic resin layer (Y), and the thermoplastic resin layer (X) pushes up the thermoplastic resin layer (Y) on the front surface and the rear surface before the resin materials on the front surface and the rear surface of the molding material are solidified (so that the thermoplastic resin layer (Y) surrounds the thermoplastic resin layer (X)), and thus can flow to a rib or boss formation region.

Figure 4:
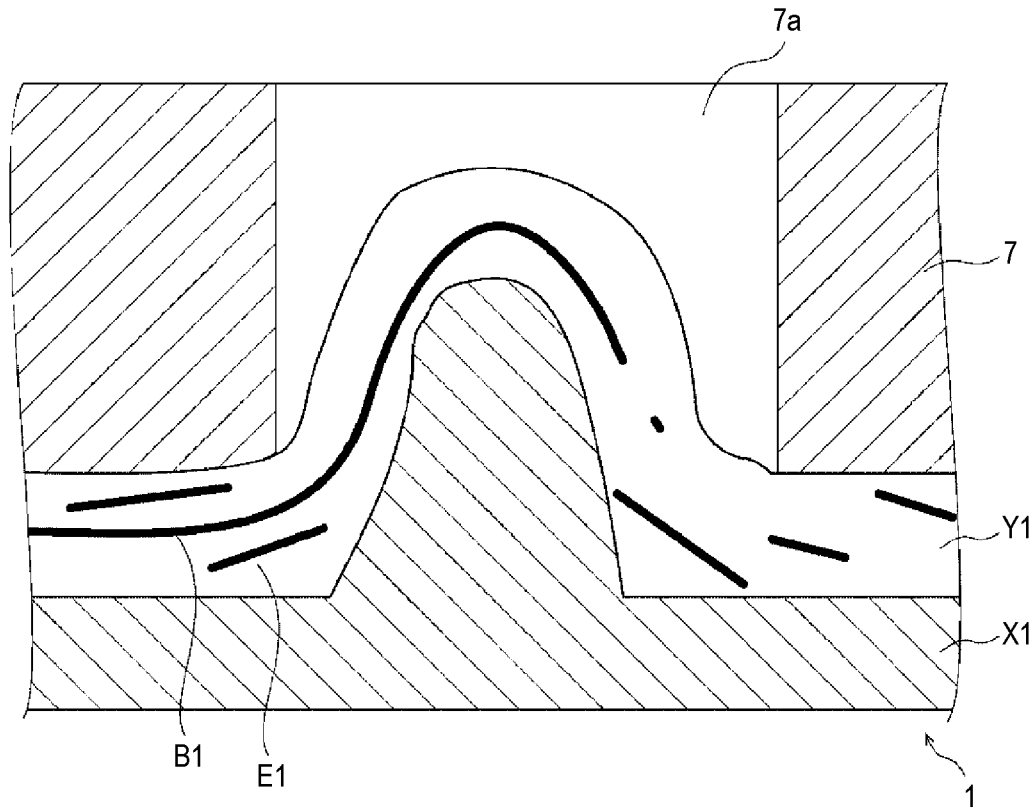
FIG. 4 is a schematic diagram in which a rib is formed by a thermoplastic resin layer X1 pushing up a thermoplastic resin layer Y1.

In FIG. 4, the reference numeral "7" indicates a mold, the reference numeral "7a" indicates a rib or boss formation region, the reference sign X1 in the figure indicates an example of the thermoplastic resin layer (X), and the reference sign Y1 indicates an example of the thermoplastic resin layer (Y). The reference sign B1 in the figure indicates an example of the carbon fibers (B).

Consequently, a rib or a boss can be formed even at the low molding pressure, and it is possible to improve complex shape follow-up property during molding while maintaining the flow characteristic of the molding material. When a high rib or boss is provided, the thermoplastic resin layer (X) may break through the thermoplastic resin layer (Y) depending on cases.

Figure 5:
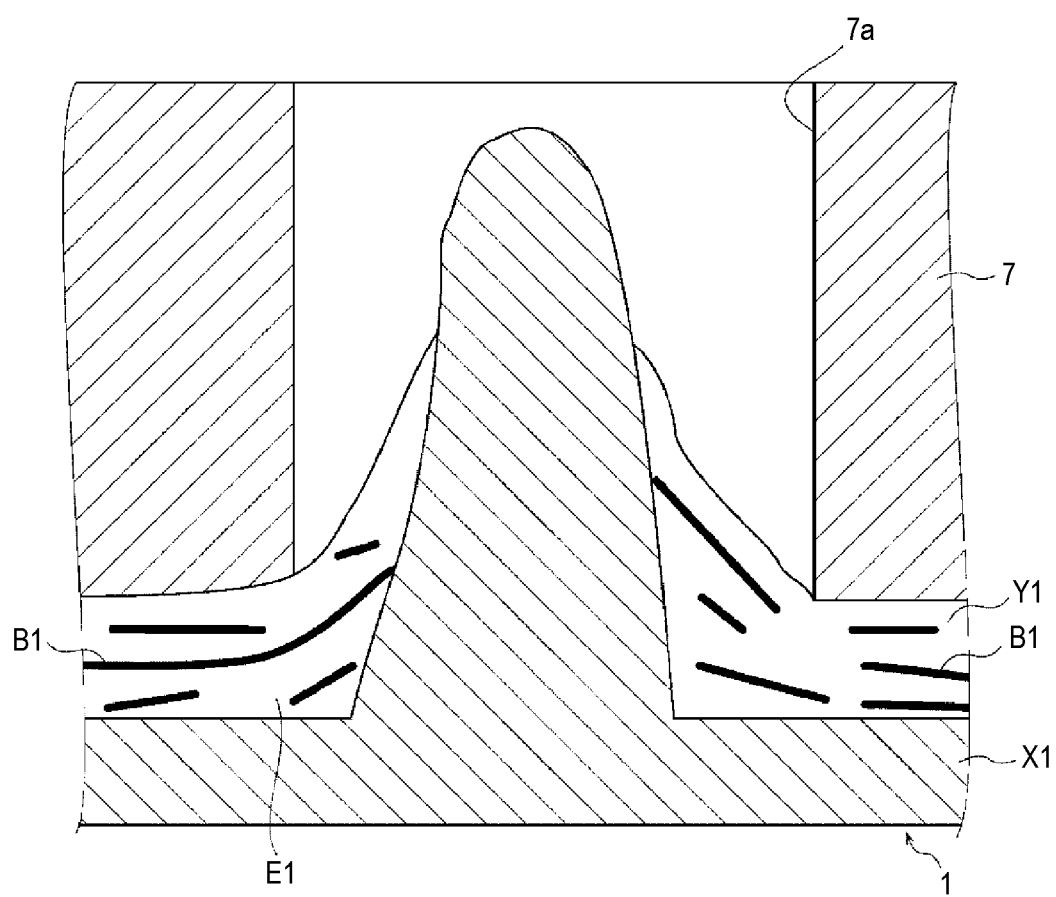
FIG. 5 is a schematic diagram in which a rib is formed by the thermoplastic resin layer X1 breaking through the thermoplastic resin layer Y1.

In FIG. 5, the reference numeral "7" indicates a mold, the reference numeral "7a" indicates a rib or boss formation region, the reference sign X1 in the figure indicates an example of the thermoplastic resin layer (X), and the reference sign Y1 indicates an example of the thermoplastic resin layer (Y). The reference sign B1 in the figure indicates an example of the carbon fibers (B).

Particularly, in a case where a weight-average fiber length of the carbon fibers (B) included in the thermoplastic resin layer (Y) is long, and the single fiber and the like (Ba) in the carbon fibers (B) increase, generally, the carbon fibers (B) in the thermoplastic resin layer (Y) hardly flow. However, in a case where the thermoplastic resin layer (X) is provided in the rear layer of the thermoplastic resin layer (Y), the flow characteristic can be improved more than in a molding material constituted by only the thermoplastic resin layer (Y) even in a case where a rib or a boss is provided on the thermoplastic resin layer (Y) side having a high ratio of the single fiber and the like (Ba).

(4-3) Effects of Thermoplastic Resin Layer (X)

In a layer configuration of the thermoplastic resin layer (X) and the thermoplastic resin layer (Y), at least one of two layers located in the outermost layers of a molding material may be the thermoplastic resin layer (Y), such as X/Y layers or X/Y/X/Y layers.

If such a molding material for the multi-layered structure is used, in a case where a rib or a boss is formed on the thermoplastic resin layer (Y) side, the thermoplastic resin layer (X) with the high flow characteristic pushes up the thermoplastic resin layer (Y) (refer to FIG. 3), or the thermoplastic resin layer (X) breaks through the thermoplastic resin layer (Y) depending on cases (refer to FIG. 4). Thus, it is possible to suppress reduction in the mechanical strength of the thermoplastic resin layer (Y) and thus to form a rib or a boss on the thermoplastic resin layer (Y) side.

Therefore, a multi-layered structure of a molding material is not limited to the three-layered structure such as Y/X/Y layers, and it is possible to form a favorable rib or a boss on the thermoplastic resin layer (Y) side even if the multi-layered structure is a two-layered structure such as X/Y layers or a four-layered structure such as X/Y/X/Y layers.

In molding in a case where a rib or a boss is not formed, for example, if a multi-layered structure of a molding material is a three-layered structure such as Y/X/Y layers, the thermoplastic resin layer (X) sufficiently flows even if a size of the thermoplastic resin layer (X) is smaller than that of the thermoplastic resin layer (Y), and thus an effect can be expected in which a thickness of a obtained molded article is uniform.

(4-4) Interface Between Layers

In a molded article obtained by molding a molding material, in a case where the thermoplastic resin layer (X) and the thermoplastic resin layer (Y) are made of the same resin material, it is hard to recognize the presence an interface between the thermoplastic resin layer (X) and the thermoplastic resin layer (Y), but it is possible to recognize the presence of the respective layers (X) and (Y) by observing distribution of fiber lengths on a section of the molded article.

(4-5) Weight Proportions of Thermoplastic Resin Layer (X) and Thermoplastic Resin Layer (Y)

(4-5-1) Range of Weight Proportion

A weight proportion of the thermoplastic resin layer (X) to a total weight of the thermoplastic resin layer (X) and the thermoplastic resin layer (Y) is preferably within a range from 5 wt % to 40 wt %. If the weight proportion of the thermoplastic resin layer (X) to the total weight is equal to or less than 40 wt %, it is preferable that a proportion of the carbon fibers (A) having a relatively short fiber length as a weight-average fiber length of 0.01 mm to less than 3 mm is not too high, the mechanical strength can be maintained.

If the weight proportion of the thermoplastic resin layer (X) to the total weight of the thermoplastic resin layer (X) and the thermoplastic resin layer (Y) is 5 wt % to 40 wt %, even in a case where molding is performed in a state in which ends of the two layers such as the thermoplastic resin layer (X) and the thermoplastic resin layer (Y) are aligned, it is possible to reduce an amount in which the thermoplastic resin layer (X) protrudes out of the end of the thermoplastic resin layer (Y) and thus to easily manufacture a molded article including the carbon fibers (B) which are long fibers up to ends of the molded article. Alternatively, in a case where a plate is created by partially disposing the thermoplastic resin layer (X) only inside the thermoplastic resin layer (Y), flowing of the thermoplastic resin layer (X) tracks the thermoplastic resin (Y) to some extent, and thus a created molded article is not partially thickened, so that surface appearance of the created molded article is improved.

If the thermoplastic resin layer (X) having the weight proportion of more than 40 wt % is used, in a case where ends of the thermoplastic resin layer (X) and the thermoplastic resin layer (Y) are aligned, and are made to flow in a plane direction so as to be molded (press molded), an amount in which the thermoplastic resin layer (X) protrudes out of the end of the thermoplastic resin layer (Y) may increase. Thus, long fibers may be deficient at an end of a molded article, and thus the molded article in which mechanical strength is weak at the end thereof may be formed.

On the other hand, if the weight proportion of the thermoplastic resin layer (X) to the total weight is equal to or more than 5 wt %, the flow characteristic during molding is easily improved.

The weight proportion of the thermoplastic resin layer (X) is more preferably within a range from 10 wt % to 35 wt %, and is even more preferably within a range from 10 wt % to 30 wt %.

(4-5-2) Proportions of Thicknesses of Thermoplastic Resin Layer (X) and Thermoplastic Resin Layer (Y)

A proportion of thickness of the thermoplastic resin layer (X) to the total thickness of the thermoplastic resin layer (X) and the thermoplastic resin layer (Y) [thickness of thermoplastic resin layer (X)/{total thickness of thermoplastic resin layer (X) and thermoplastic resin layer (Y)}] is preferably within a range from 0.05 to 0.4. If the thickness proportion of the thermoplastic resin layer (X) to the total thickness is equal to or less than 0.4, this is preferable in that the mechanical strength can be maintained.

For example, in a case where a thickness of a molding material is 3 mm, "total thickness of thermoplastic resin layer (X)/total thickness of thermoplastic resin layer (Y)" is preferably 0.15 mm to 1.2 mm/2.85 mm to 1.8 mm, more preferably 0.3 mm to 1.05 mm/2.7 mm to 1.95 mm, and even more preferably 0.3 mm to 0.9 mm/2.7 mm to 2.1 mm.

For example, in a case where a thickness of a molding material is 4 mm, "total thickness of thermoplastic resin layer (X)/total thickness of thermoplastic resin layer (Y)" is preferably 0.2 mm to 1.6 mm/3.8 mm to 2.4 mm, more preferably 0.4 mm to 1.4 mm/3.6 mm to 2.6 mm, and even more preferably 0.4 mm to 1.2 mm/3.6 mm to 2.8 mm.

In a case where the thermoplastic resin layer (Y) is disposed in a front layer, a thickness of the thermoplastic resin layer (Y) is preferably equal to or less than 2 mm, and is more preferably equal to or less than 1 mm. If the thickness is equal to or less than 2 mm, as illustrated in FIG. 4 or 5, it is possible to easily push up or break through the thermoplastic resin layer (Y).

(5) Density Parameters of Thermoplastic Resin Layer (X) and Thermoplastic Resin Layer (Y)

(5-1) Density Parameter (P)

(5-1-1) Summary

It is generally known that the flow characteristic of a thermoplastic resin layer including carbon fibers differs depending on the kind, a shape, an arrangement, a combination ratio, and the like of carbon fiber or thermoplastic resin. In order to form a rib or a boss through press molding, a molding material having a high flow characteristic is preferably used. As one of criteria for determining a level of the flow characteristic, a density parameter (P) which is a criterion for determining the magnitude of fiber interference will be described below.

The density parameter is also disclosed in "Doi, M. and Edwards, S. F., The Theory of Polymer Dynamics 324 (1986)", and is a parameter known to those skilled in the art.

(5-1-2) Calculation Expression

The density parameter (P) is an index indicating the extent of fiber interference, and is a parameter defined by a combination amount of carbon fibers, a fiber length, a fiber diameter, the number of single fiber forming the flow unit, and the like and is expressed by the following Equation (1).

$$P=(Q \times Ln^3)/H \quad (1)$$

Here, q indicates the number of flow units of carbon fibers which are included in a thermoplastic resin layer per unit area (1 mm$^2$), Ln indicates a number-average fiber length (mm) of the carbon fibers, and h indicates a thickness (mm) of the thermoplastic resin layer.

The number q of flow units is derived by the following Equation (7).

$$q=(Wf/10^6)/(\pi \times (D \times 10^{-3}/2)^2 \times Ln \times \rho_f \times N_{ave}) \quad (7)$$

Here, Wf indicates a fiber areal weight (g/m$^2$) of the carbon fibers included in the thermoplastic resin layer, that is, "Wf/10$^6$" in Equation (7) indicates a fiber areal weight (g/mm$^2$) per mm$^2$. D indicates a diameter (μm) of a single fiber of carbon fibers, that is, "$\pi \times (D \times 10^{-3}/2)^2$" in Equation (7) indicates a sectional area (mm$^2$) of a single fiber of the carbon fibers.

Ln indicates a number-average fiber length (mm) of the carbon fibers, $\rho_f$ indicates a density (g/mm$^3$) of the carbon fibers, and $N_{ave}$ indicates an average number of fibers (number) included in a carbon fiber bundle which is a flow unit.

D indicates a diameter (μm) of a single fiber of carbon fibers, and uses a single fiber diameter $D_A$ of the carbon fibers (A) and a single fiber diameter $D_B$ of the carbon fibers (B) according to the thermoplastic resin layers (X) and (Y).

The flow unit is an aggregate or a simple substance (a bundle) of carbon fibers, and, in a case where a plurality of carbon fiber bundles are present in a thermoplastic resin layer, each carbon fiber bundle is a flow unit.

Each parameter used to derive the density parameter (P) is calculated on the basis of a thermoplastic resin layer before being heated. There is a case where the thermoplastic resin layer is heated, and thus a molding material added with a blowing agent is expanded, thereby causing a volume change, or a case where a thermoplastic resin is melted due to heating, and thus springback occurs due to elasticity recovery of carbon fibers in which constraint caused by the resin material is released. This causes a volume change, and thus the limitation is so as to remove a problem in which obtained density parameters (P) are different from each other even if substantial combination ratios between the carbon fibers and the thermoplastic resin are the same as each other before and after heating.

(5-1-3) Average Number of Fibers ($N_{ave}$)

The average number $N_{ave}$ of fibers is a concept which is different from the average number ($N_B$) of fibers of the carbon fiber bundle (Bb), and indicates the number (an average of the whole including bundles and a single fiber) of single fiber forming the flow unit. Hereinafter, the average number $N_{ave}$ of fibers of the carbon fibers (A) is indicated by $N(A)_{ave}$, and the average number $N_{ave}$ of fibers of the carbon fibers (B) is indicated by $N(B)_{ave}$, in some cases.

(5-2) Range (5-2-1) Thermoplastic Resin Layer (Y)

The thermoplastic resin layer (Y) preferably has the density parameter ($P_Y$) of $1 \times 10^2$ to less than $1 \times 10^4$. The thermoplastic resin layer (Y) is mainly suitable for forming a face plate portion.

In this case, in order to improve surface appearance of the face plate portion, a weight-average fiber length of the carbon fibers (B) in the thermoplastic resin layer (Y) is preferably short, and, in order to increase the rigidity, the weight-average fiber length of the carbon fibers (B) is preferably long.

From the viewpoint of balance between the surface appearance and the rigidity, a density parameter ($P_Y$) of the thermoplastic resin layer (Y) is more preferably $5.0 \times 10^2$ to less than $1 \times 10^4$.

(5-2-2) Thermoplastic Resin Layer (X)

Preferably, the thermoplastic resin layer (X) has a density parameter ($P_X$) of $1 \times 10^1$ or more, and the density parameter is $1.0 \times 10^{-3}$ times to 3.0 times the density parameter ($P_Y$) of the thermoplastic resin layer (Y). In other words, a ratio ($P_X/P_Y$) of the density parameter $P_X$ of the thermoplastic resin layer (X) to the density parameter $P_Y$ of the thermoplastic resin layer (Y) is preferably $1.0 \times 10^{-3}$ to 3.0.

If the density parameter ($P_X$) of the thermoplastic resin layer (X) relative to the thermoplastic resin layer (Y) is too low, in a case where ends of both of the thermoplastic resin layers (X) and (Y) are aligned and molding is performed, the thermoplastic resin layer (X) with the high flow characteristic flows out of the thermoplastic resin layer (Y), and thus fiber distributions are different from each other at the end and the center of a molded article. Particularly, a portion in which the carbon fibers (A) forming the thermoplastic resin layer (X) and having a short weight-average fiber length are present a lot is formed at the end (refer to FIG. 14). A molding material having such a multi-layered structure causes mechanical properties at the end of the molded article to be lowered.

The density parameter ($P_X$) of the thermoplastic resin layer (X) is preferably within a range from $1.0 \times 10^{-3}$ times to 3.0 times the density parameter ($P_Y$) of the thermoplastic resin layer (Y), more preferably within a range from $1.0 \times 10^{-3}$ times to $9.0 \times 10^{-1}$ times the density parameter ($P_Y$) of the thermoplastic resin layer (Y), and even more preferably within a range from $1.0 \times 10^{-2}$ times to $1.0 \times 10^{-1}$ times the density parameter ($P_Y$) of the thermoplastic resin layer (Y).

In a case where the density parameter ($P_X$) of the thermoplastic resin layer (X) is within the range relative to the density parameter ($P_Y$) of the thermoplastic resin layer (Y), the thermoplastic resin layer (X) easily tracks flow of the thermoplastic resin layer (Y). Consequently, it is possible to obtain a molded article in which a difference between fiber distributions at the center and the end thereof is small. A molding material which allows so-called hybrid molding to be performed is obtained.

Figure 14:
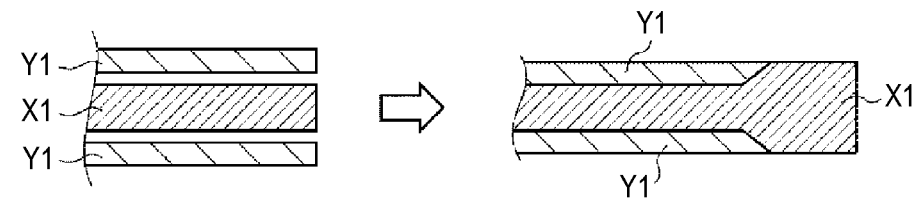
FIG. 14 is a trial examination diagram in a case where the thermoplastic resin layer Y does not remain at the end of the molded article.

Even in a case where molding is performed by using the thermoplastic resin layers (X) and (Y) having different sizes without aligning ends thereof as in FIG. 14, the thermoplastic resin layer (X) easily tracks flow of the thermoplastic resin layer (Y), and thus surface appearance of a created molded article is improved, and a molding material which allows hybrid molding to be easily performed is also obtained.

Since surface appearance in a rib can be improved by making a weight-average fiber length short, a molding material in which the thermoplastic resin layer (X) is disposed in a portion where the rib is molded is preferably used from this viewpoint, and the density parameter ($P_X$) of the thermoplastic resin layer (X) is preferably equal to or less than $1 \times 10^3$.

Conversely, since a reinforcement effect in the rib can be increased by making a weight-average fiber length long, the density parameter ($P_X$) of the thermoplastic resin layer (X) is more preferably equal to or more than $5 \times 10^1$.

A method of controlling the density parameter P is not particularly limited, but there may be a method of increasing $N_{ave}$ in order to reduce the density parameter P (to increase fluidity) when the number-average fiber length Ln is constant.

2. Molding Material Manufacturing Method (1) Molding Material 1

A manufacturing method of the molding material 1 as an example of the embodiment includes a step of preparing a material x corresponding to the thermoplastic resin layer X1 forming the molding material 1, a step of preparing a material y corresponding to the thermoplastic resin layer Y1 forming the molding material 1, and a step of stacking the prepared material x and material y.

(1-1) Preparation of Material x

A manufacturing method of the material x is not particularly limited as long as the thermoplastic resin layer X1 can be created to include the carbon fibers A1 whose weight-average fiber length ($Lw_A$) is 0.01 mm to less than 3 mm, but, for example, the following manufacturing method is exemplified.

(1-1-1) Manufacturing Example 1

In Manufacturing Example 1, a granular resin composition c1 containing the carbon fibers A1, and the prepared resin composition c1 is melted and is formed into a sheet material. The formed sheet material is a material x1 which is manufactured according to Manufacturing Example 1 which is an example of the manufacturing method of the material x.

(1-1-1-1) Preparation of Resin Composition c1

The material x1 is not particularly limited as long as the granular resin composition c1 can be prepared, and may employ a resin pellet available in the market and containing carbon fibers, and may employ a pulverized material which will be described later.

As the resin pellet available in the market, there is, for example, PLASTRON which is a long fiber-reinforced resin made by Daicel Corporation and may be used in a step in (1-1-1-2) which will be described later.

As the pulverized material, a pulverized material obtained by pulverizing a carbon fiber-reinforced thermoplastic resin composite material created in advance may be used. As the pulverized material, a broken material or an end material (hereinafter, simply referred to as a "broken material or the like") generated a manufacturing step of a thermoplastic resin molding material including carbon fibers or a molding step using the same is preferably used. By using a pulverized material obtained by pulverizing such a broken material or the like, it is possible to reduce manufacturing cost and also to contribute to resources saving or global environment conservation.

Figure 6:
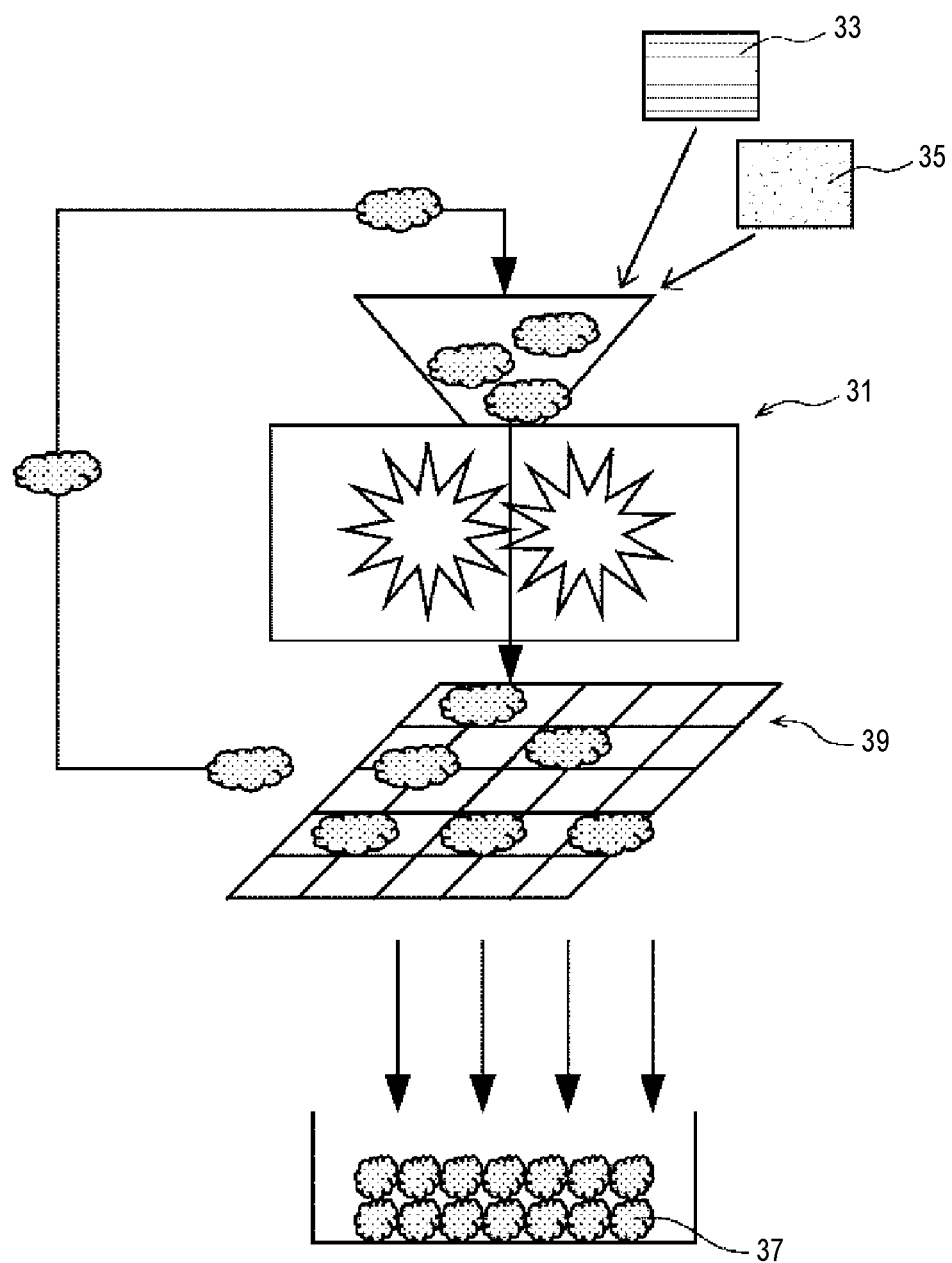
FIG. 6 is an explanatory diagram illustrating a pulverized material producing step.

FIG. 6 is an explanatory diagram illustrating a pulverized material.

In FIG. 6, the reference numeral 31 indicates a pulverizer, the reference numerals 33 and 35 indicate broken materials or the like, and the reference numeral 37 indicates a pulverized material. The pulverized material 37 is sorted into a size which is equal to or less than a predetermined size by a filter 39.

A resin pellet or a base material of the pulverized material 37 may be a material with the same configuration as that of the thermoplastic resin layer Y1, may be a material with a different configuration (one kind or a plurality of kinds of materials), and may be a material in which a material with the same configuration and a material with a different configuration (one kind or a plurality of kinds of materials) are combined with each other.

As the resin composition c1, not only is either the resin pallet or the pulverized material 37 used, but also both of the resin pellet and the pulverized material may also be used. Hereinafter, the resin pellet or the pulverized material 37 may also be referred to as the granular resin composition c1.

When the material x1 is created, the resin pellet or the pulverized material 37 may be used as it is, and a thermoplastic resin obtained by further pulverizing the resin pellet or the pulverized material 37 may be used.

(1-1-1-2) Creation of Material x1

The sheet-shaped (plate-shaped) material x1 can be obtained by heating and pressing the granular resin composition c1 or a pulverized thermoplastic resin with a hot press machine. Here, regarding a method of performing heating and pressing, heating and pressing may be performed separately, and heating and pressing are preferably performed according to press molding and/or heat molding.

Specifically, preferably, the granular resin composition c1 is heated so as to be melted under pressure, and the carbon fibers A1 is impregnated with the thermoplastic resin C1 and is then cooled. The heating and pressing operations are preferably performed in a state in which the resin composition c1 or the like is disposed in a mold.

A pressure condition when the material x1 is obtained from the resin composition c1 is preferably equal to or lower than 10 MPa, more preferably equal to or lower than 8 MPa, and even more preferably equal to or lower than 5 MPa. If the pressure is equal to or lower than 10 MPa, it is preferable that a cheaper or general molding device (press device) can be used, and thus it is possible to suppress capital investment or maintenance cost even in a case where the material x1 for a large molding material is molded.

A heating temperature for obtaining the material x1 is preferably equal to or higher than the melting point and lower than the decomposition temperature in a case where a thermoplastic resin included in the granular resin composition c1 or the pulverized thermoplastic resin is crystalline, and is preferably equal to or higher than the glass transition temperature and lower than the decomposition temperature in a case where the thermoplastic resin is non-crystalline. The decomposition temperature of the thermoplastic resin is preferably the thermal decomposition temperature in air.

A thickness of the material x1 is substantially the same as a thickness of the thermoplastic resin layer X1, and thus the thickness of the material x1 may be adjusted in accordance with the thickness of the thermoplastic resin layer X1. In the same manner for a size of the material x1, a mold may be created as appropriate in accordance with a size of the thermoplastic resin layer X1, and a large plate may be created so as to be cut in accordance with the size of the thermoplastic resin layer X1.

(1-1-2) Manufacturing Example 2

In Manufacturing Example 2, as a raw material in a manufacturing example of the material x, for example, the granular resin composition c1 or the like described in the above (1-1-1) is put into an extruder so as to be formed into a sheet material (hereinafter, referred to as a "sheet material forming step" in some cases). The sheet material is a material x2 manufactured in Manufacturing Example 2 which is an example of the manufacturing method of the material x.

Figure 7:
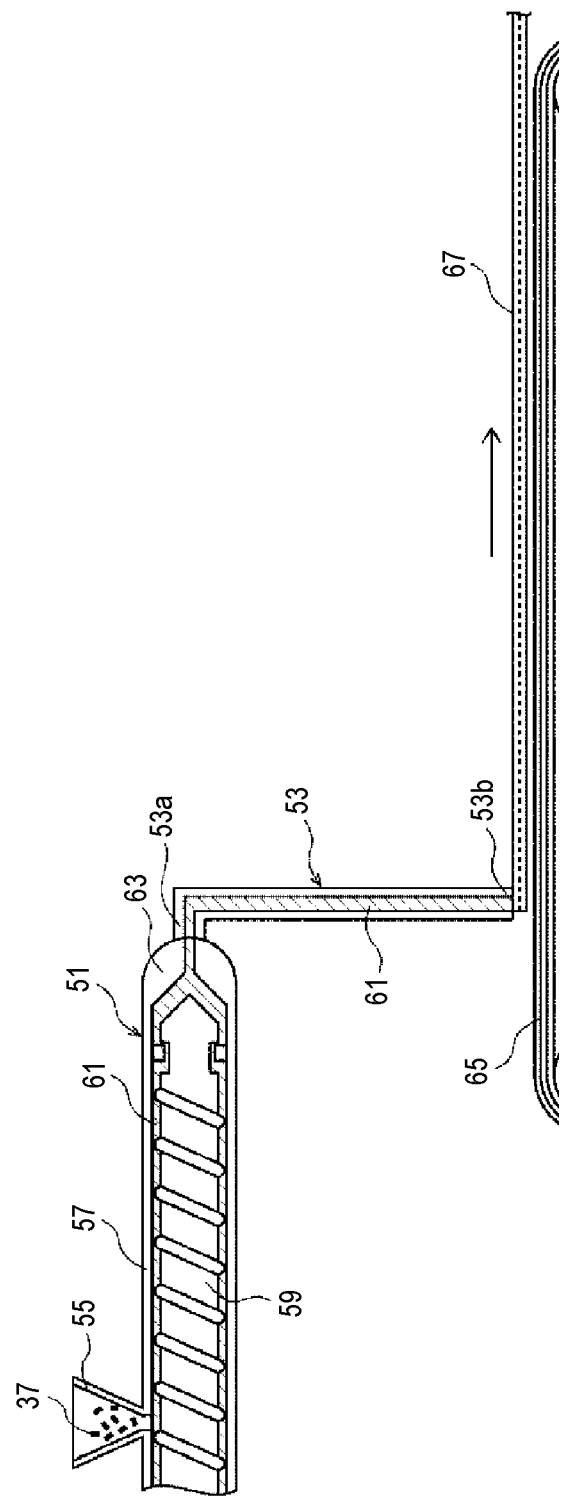
FIG. 7 is an explanatory diagram illustrating a sheet material forming step.

FIG. 7 is an explanatory diagram illustrating the sheet material forming step.

The sheet material forming step is performed by using, for example, a screw extruder 51 and a T-die 53. In the extruder 51, the pulverized material 37 or a resin pellet supplied from a hopper 55 is melted by a heating cylinder 57, and the melted thermoplastic resin and carbon fibers (hereinafter, the resin and the carbon fibers are simply referred to as "melted resin material and the like" 61) are kneaded with each other and are also extruded to the T-die 53 from a nozzle 63 of the heating cylinder 57, while a screw main body 59 is being rotated.

The T-die 53 has a T-shaped passage therein, receives the melted resin material and the like 61 via an end (an upper end in FIG. 7) 53a on an opposite side to a horizontal portion of the T letter, and discharges the melted resin material and the like from the horizontal portion (a lower end in FIG. 7) 53b of the T letter in a straight line shape extending in a direction orthogonal to the paper surface of FIG. 7.

The discharged melted resin material and the like 61 flow down onto a conveyer 65 which performs conveyance in a predetermined direction. Consequently, a continuous sheet material 67 is formed in a conveyance direction (right direction in FIG. 7) of the conveyer 65. The melted resin material and the like 61 is conveyed on the conveyer 65 so as to be gradually solidified.

In the same manner as in Manufacturing Example 1, a thickness of the material x2 is substantially the same as a thickness of the thermoplastic resin layer X1, and thus the thickness of the material x2 may be adjusted in accordance with the thickness of the thermoplastic resin layer X1. In the same manner for a size of the material x2, the sheet material 67 obtained in the above step may be cut in accordance with the size of the thermoplastic resin layer X1.

As a method of forming a sheet-shaped material, the T-die is used in a state in which the resin composition c1 or the resin pellet including the carbon fibers A1 is melted, but a sheet-shaped material may be formed in other methods. As other methods, calender molding in which melted resin material and the like are extended by a calender roll may be used.

(1-1-3) Manufacturing Example 3

In Manufacturing Example 3, a strand formed of a plurality of carbon fibers (filaments) is cut (cutting step), the cut carbon fibers A1 and a resin material for the thermoplastic resin C1 are sprayed, and thus a precursor in which the carbon fibers are randomly oriented in two-dimensional directions (precursor forming step), and the resin material is melted and solidified so as to formed into a sheet material (sheet material forming step). This sheet material is a material x3 manufactured in Manufacturing Example 3 which is an example of the manufacturing method of the material x.

(1-1-3-1) Cutting Step

The strand is cut so that the carbon fibers A1 is obtained. Preferably, in this step, the strand is cut by using a knife. As the knife used for cutting, a rotary cutter is preferably used.

In a case where a state of the carbon fibers A1 is, for example, a fiber bundle, in order to make the average number $N(A)_{ave}$ of fibers of the carbon fibers A1 within a preferable range, control is preferably performed by adjusting a size of the strand provided in the cutting step, for example, a width of a bundle or the number of fibers per width.

(1-1-3-2) Precursor Forming Step

A precursor of a material y1 which will be described later is formed by spraying carbon fibers and resin particles. The precursor forming step in Manufacturing Example 3 is similar to a step of forming the precursor of the material y1. Thus, with reference to FIG. 8, the precursor forming step will be described.

Figure 8:
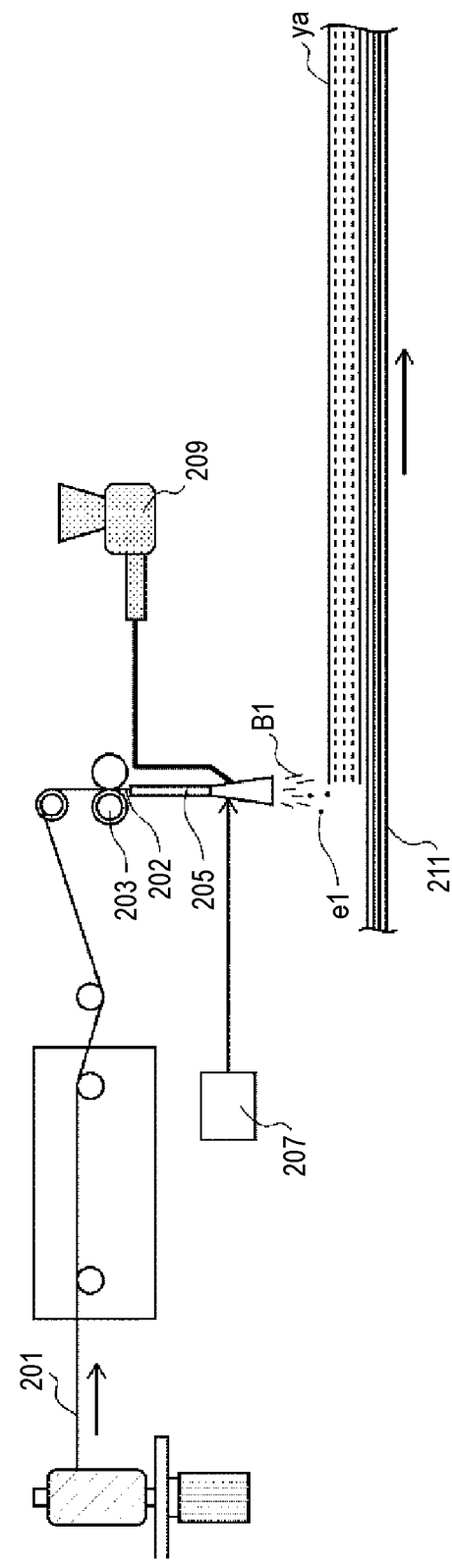
FIG. 8 is a schematic diagram illustrating a method of manufacturing a material y1.

In this step, the carbon fibers A1 (corresponding to "B1" in FIG. 8) obtained through cutting are diffused in air, thermoplastic resin particles c2 (corresponding to "e1" in FIG. 8) are also supplied, the carbon fibers A1 are sprayed onto a support body (211) along with the thermoplastic resin particles c2, the carbon fibers A1 and the thermoplastic resin particles c2 in a state of being mixed are accumulated and fixed on the support body (211) so as to form a precursor xa (corresponding to "ya" in FIG. 8).

In this step, the thermoplastic resin particles c2 supplied through a path separate from the carbon fibers A1 are sprayed toward the support body (211), and both of the two materials in a state of being substantially uniformly mixed with each other are accumulated on the breathable support body (211), and are fixed in this state.

At this time, if the support body (211) is constituted of a conveyer formed of nets, and is continuously moved in one direction so that the carbon fibers A1 and the thermoplastic resin particles c2 are accumulated thereon, the parallax can be continuously formed.

In this step, an amount of the supplied thermoplastic resin particles c2 may be adjusted within an appropriate preferable weight range according to the above-described fiber volume fraction (Vf).

Amounts of the carbon fibers A1 and the thermoplastic resin particles c2 may be adjusted as appropriate according to the content ratio of the carbon fibers A1 included in the obtained thermoplastic resin layer X1. A step of forming the precursor xa thereof includes a step of fixing the carbon fibers A1 and the thermoplastic resin particles c2.

(1-1-3-3) Sheet Material Forming Step and Step of Obtaining Material x3

A sheet material which will become the material x3 can be obtained by heating and pressing the obtained precursor xa. Here, regarding a method of performing heating and pressing, heating and pressing may be performed separately, and heating and pressing are preferably performed according to press molding and/or heat molding. Specifically, heading and pressing may be performed in the condition described in "(1-1-1-2) Creation of material x1".

Here, in a case where a size of the sheet material is the same as a size of the material x3, the sheet material becomes the material x3.

In a case where the sheet material is larger than the material x3, a sheet material obtained by cutting the sheet material in accordance with the size of the material x3 becomes the material x3.

(1-2) Preparation of Material y

As described above, the carbon fibers B1 included in the material y may be constituted by single fibers, may be constituted by fiber bundles with the number which is smaller than a critical number of single fiber and single fibers, may be constituted by fiber bundles with the number which is equal to or larger than a critical number of single fiber and single fibers, and may be constituted by the combination thereof.

In a case of using the fibers in a state of the fiber bundle, the number of single fiber forming each fiber bundle may be substantially uniform in each fiber bundle, or may differ. In addition, in a case of using the fibers in a state of the fiber bundle, the carbon fibers B1 are preferably randomly oriented in two-dimensional directions and are used.

Herein, a single fiber and the like B1a and a carbon fiber bundle B1b are mixed into the carbon fibers B1, and a description will be made of manufacturing of the material y1 using the single fiber and the like B1a and the carbon fiber bundle B1b.

FIG. 8 is a diagram illustrating a manufacturing method of the material y1.

(1-2-1) Step of Cutting Strand (Cutting Step)

A preferable step of obtaining a cut fiber 202 by cutting a strand 201 is a step of cutting the strand 201 by using a knife. A rotary cutter 203 is preferably used as the knife for cutting.

In a case where the carbon fiber bundle B1b is included in the carbon fibers B1, in order to make the average number ($N_B$) of fibers of the carbon fiber bundle B1b within the range shown in the above Expression (3), control is preferably performed by adjusting a size of the strand 201 provided in the cutting step, for example, a width of the bundle or the number of fibers per width.

As the strand 201, a strand in which the average number ($N_B$) of fibers of the carbon fiber bundle B1b is within the range in Expression (3) in advance is preferably used. However, the strand 201 becomes more expensive as the number of fibers in a fiber bundle becomes smaller. Therefore, in a case of using the strand 201 which can be available at low cost and has a large number of fibers, it is preferable that a width or the number of fibers per width of the strand 201 provided in the cutting step is adjusted, and then the strand is provided in the cutting step.

(1-2-2) Step of Opening Cut Fiber 202 (Opening Step)

In the opening step, the cut fiber 202 is introduced into a tube 205 so that the cut fiber 202 is opened. Air supplied from an air supply device 207 is blown to the cut fiber, and the cut fiber can be opened as appropriate. In addition, the fibers which are opened through air blowing are the carbon fibers B1 of the material y1.

(1-2-3) Step of Obtaining Precursor ya

In a step of obtaining a precursor ya, the opened carbon fibers B1 are diffused in air, powdery particulate or staple fibrous thermoplastic resins (hereinafter, collectively referred to as "thermoplastic resin particles and the like") e1 are supplied from a resin supply device 209, the carbon fibers B1 are sprayed onto the support body 211 provided under the opening device (tube 205) along with the thermoplastic resin particles and the like e1, and the carbon fibers B1 and the thermoplastic resin particles and the like e1 in a state of being mixed are accumulated and fixed on the support body 211 so as to form the precursor ya.

Here, the carbon fibers B1 are preferably sprayed so as to be randomly oriented in two-dimensional directions.

In a manufacturing method of the precursor ya, the strand 201 is cut in a predetermined length, the cut fiber 202 is separated and is opened into fiber bundles with a desired size (thickness), the opened carbon fibers B1 are sprayed toward the surface of the support body (hereinafter, referred to as a "fixing net" in some case) 211 along with the thermoplastic resin particles and the like e1 so as to be accumulated and fixed, and thus the precursor ya can be formed.

(1-2-4) Heating Compressing Step

In a heating compression step, the precursor ya is heated and pressed. Consequently, it is possible to obtain the material y1 including the thermoplastic resin particles and the like e1 and the carbon fibers B1.

Here, regarding a method of performing heating and pressing, heating and pressing may be performed separately, and heating and pressing are preferably performed according to press molding and/or heat molding.

The precursor ya has a feature in which the carbon fibers B1 can be easily impregnated with the thermoplastic resin particles and the like e1, and can thus be efficiently obtained as an intermediate molded article according to a method such as hot press molding.

Specifically, it is preferable that the thermoplastic resin particles and the like e1 of the precursor ya are melted under pressure, and the melted thermoplastic resin (e1) is impregnated between a single fiber and a single fiber of the carbon fiber bundle B1b and the single fiber and the like B1a and is then cooled. The heating and pressing operations are preferably performed in a mold.

A pressure condition for the precursor ya when the material y1 is obtained is preferably equal to or lower than 10 MPa, more preferably equal to or lower than 8 MPa, and even more preferably equal to or lower than 5 MPa. If the pressure is lower than 10 MPa, it is preferable that a cheaper or general molding device (press device) can be used, and thus it is possible to suppress capital investment or maintenance cost even in a case where the large-sized precursor ya is heated and pressed.

A temperature for obtaining the material y1 by heating the precursor ya is preferably equal to or higher than the melting point and lower than the decomposition temperature in a case where the thermoplastic resin particles and the like e1 included in the precursor ya are crystalline, and is preferably equal to or higher than the glass transition temperature and lower than the decomposition temperature in a case where the thermoplastic resin particles and the like are non-crystalline. The decomposition temperature of the thermoplastic resin is preferably the thermal decomposition temperature in air.

A thickness of the material y1 is substantially the same as a thickness of the thermoplastic resin layer Y1, and thus the thickness of the material y1 may be adjusted in accordance with the thickness of the thermoplastic resin layer Y1. In the same manner for a size of the material y1, the material y1 may be created as appropriate in accordance with the size of the thermoplastic resin layer Y1.

During creation of the material y1, the fibrous or powdery thermoplastic resin particles e1 are provided as a thermoplastic resin, but a melted thermoplastic resin may be supplied. In this case, the material may be created by spraying only a fiber bundle, and then by forming a melted resin in a sheet shape.

(1-3) Stacking Step

Figure 9:
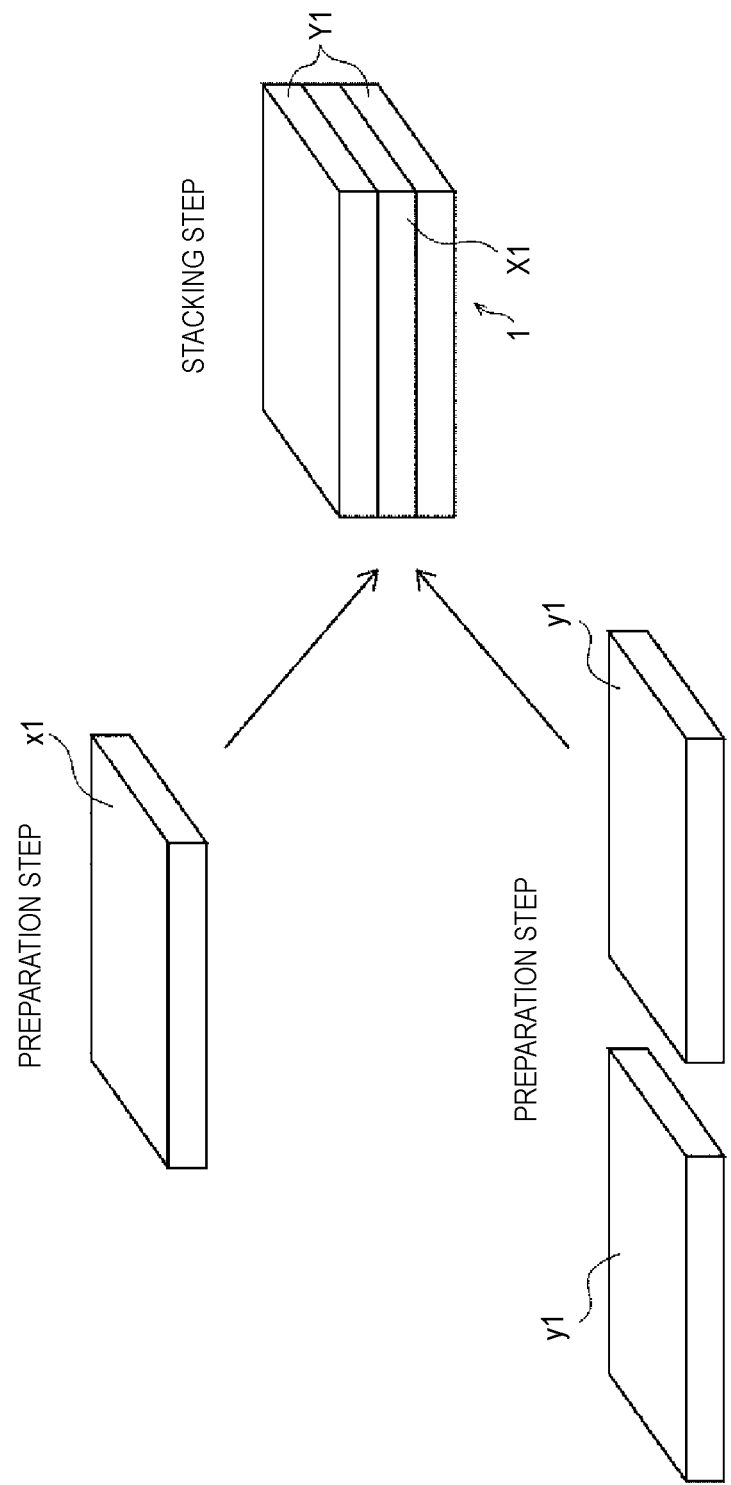
FIG. 9 is an explanatory diagram illustrating a method of manufacturing the molding material for the three-layered structure which is an example of the embodiment.

FIG. 9 is an explanatory diagram illustrating an example of a manufacturing method of the molding material 1.

In a stacking step, for example, as illustrated in FIG. 9, the prepared material x1 and material y1 may be stacked in a predetermined configuration. Here, a single material x1 and two materials y1 are stacked so that the material x1 is interposed therebetween. In other words, stacking is performed so that the two materials y1 are located in a front layer and a rear layer.

Consequently, the molding material 1 having the three-layered structure is formed. Hereinafter, the material x1 is used as the thermoplastic resin layer X1, but the above-described materials x2 and x3 may be used, and materials manufactured according to methods other than the above-described methods here may be used. The single thermoplastic resin layer X1 may be constituted by a plurality of materials x1, and the single thermoplastic resin layer Y1 may be constituted by a plurality of materials y1.

In a case where the single thermoplastic resin layer X1 is constituted by a plurality of materials, one kind of material of the materials x1, x2 and x3 may be used, and a plurality of kinds of materials may be used. In a case where there are a plurality of thermoplastic resin layers X1, all of the layers may be constituted by the same kind of material of the materials x1, x2 and x3, and may be constituted by a plurality of kinds of materials.

In addition, in a case where molding materials having other multi-layered structures are created, stacked configurations may be adjusted as appropriate.

(2) Molding Material 2

In the manufacturing method of the molding material 1, the material x1 for the thermoplastic resin layer X1 and the material y1 for the thermoplastic resin layer Y1 are manufactured separately, and are then stacked so as to form the molding material 1, but at least one of the thermoplastic resin layer X1 and the thermoplastic resin layer Y1 may be directly stacked on the other (one material is directly formed on the other material) so as to manufacture a molding material.

Figure 10:
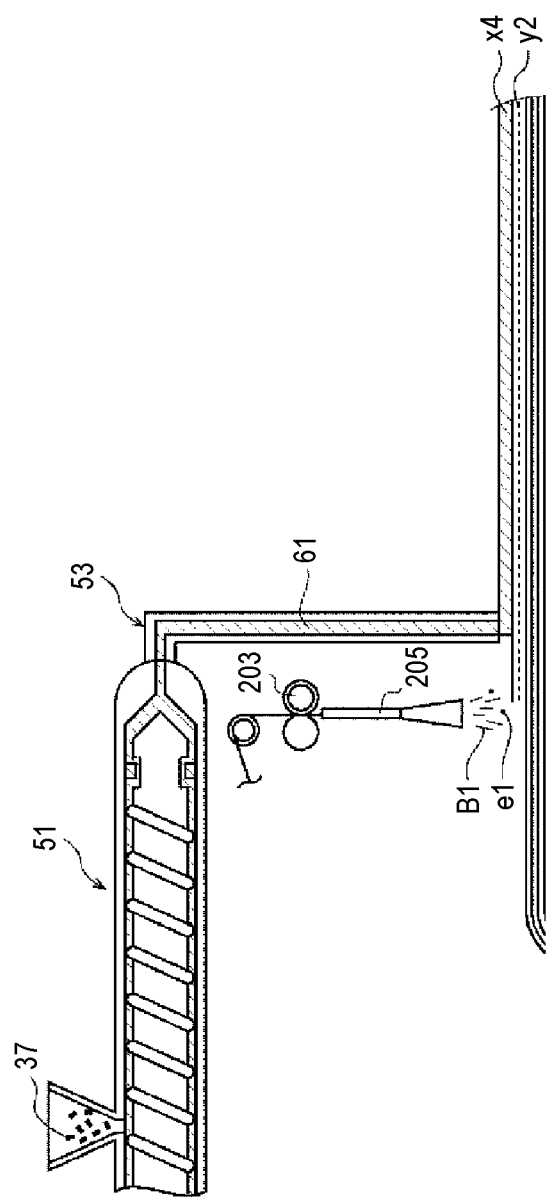
FIG. 10 is an explanatory diagram illustrating a method of manufacturing a molding material.

FIG. 10 is an explanatory diagram illustrating an example of a manufacturing method of the molding material 2.

A manufacturing method of the molding material 2 includes a step of forming a sheet-shaped material y2 corresponding to the thermoplastic resin layer Y1, and a step of forming a sheet-shaped material x4 on the material y2 formed through the previous step. A sheet material having undergone these steps is cut in a predetermined dimension so as to become the molding material 2.

The material y2 is formed by spraying the carbon B1 which is cut in a predetermined length and the thermoplastic resin particles e1 as described in 2. (1), (1-2), (1-2-1) to (1-2-3). As illustrated in FIG. 10, the devices illustrated in FIG. 8 may be used.

In FIG. 10, for convenience, a cutting device 203 and an opening device (tube) 205 are illustrated. The opening device 205 is disposed on the upstream side of the T-die 53.

As described in 2. (1), (1-1), (1-1-1-1), the material x4 is formed by melting the pulverized material 37 created in advance or a resin pellet, and applying the melted resin 61 including the carbon fibers A1 having a weight-average fiber length which is within the range from 0.1 mm to 3 mm in a sheet shape.

Herein, as illustrated in FIG. 10, the material x4 may be formed by using, for example, the manufacturing method and the manufacturing apparatus of the material x2 (refer to FIG. 7) described in 2. (1), (1-1), (1-1-2). Specifically, the apparatus may be constituted of a conveyer (including a driving unit) forming the support body 211 which is continuously moved in one direction, the screw extruder 51, and the T-die 53.

A material may be formed on the material y2 by spraying the above-described pulverized material 37 or the like on the material y2. Reversely to the manufacturing method described here, the material x2 or x3 may be first created, and then the material y2 may be formed on the material x2 or x3.

3. Others (1) Reinforcing Fiber

Reinforcing fibers such as glass fibers, aramid fibers, or carbon fibers may be added to a molding material in addition to the carbon fibers A1 and the carbon fibers B1. Specifically, as long as a weight proportion of the reinforcing fibers to the whole amount thereof is within a range from more than 0 wt % to 49 wt %, the reinforcing fibers may be included regardless of a fiber length or the degree of opening.

(2) Other Agents

Various fibrous fillers such as glass fibers or organic fibers, or nonfibrous fillers, or additives such as flame retardants, anti-UV agents, pigments, release agents, softening agents, plasticizers, and surfactants may be included in the molding material.

EXAMPLES

A description will be made of mechanical characteristics of a molded article obtained by molding a molding material having the same multi-layered structure as that of the molding material 1, and moldability of the molding material, by using Examples. In order to manufacture a material, the material x1 described in the above (1-1-1) Manufacturing Example 1 of the above (1-1) Preparation of material x, and the material y1 described in the above (1-2) Preparation of material y are used as materials.

For examination through comparison, a case where the molding material (only the material y1) of the related art is used as a molding material is referred to as Comparative Example 1, and a case where only the molding material x1 is used as a molding material is referred to as Comparative Example 2.

The reference sign indicating the comparative example is differentiated by adding "c" to the reference sign described in Example. For example, in the comparative example, the reference sign indicating a thermoplastic resin layer corresponding to the thermoplastic resin layer X1 in Example is "X1c". Tables 1, 2 and 3 summarize configurations and characteristics of Examples and comparative examples.

1. Evaluation Method (1) Method of Measuring Fiber Length of Carbon Fiber Included in Thermoplastic Resin Layer In Example will be described later, a strand is cut with the rotary cutter so that the weight-average fiber length ($Lw_A$) of the carbon fibers A1 included in the pulverized material 37 is 0.01 mm to less than 3 mm, and the weight-average fiber length ($Lw_B$) of the carbon fibers B1 is 3 mm to 100 mm. In other words, in the present example, fiber characteristics of the carbon fibers A1 included in the thermoplastic resin layer X1 are maintained as characteristics of carbon fibers included in the pulverized material 37. In addition, fiber characteristics of the carbon fibers B1 included in the thermoplastic resin layer Y1 are maintained as characteristics of carbon fibers included in the precursor ya and the material y1.

Therefore, the characteristics of the carbon fibers A1 were observed by analyzing the carbon fibers included in the pulverized material 37, and the characteristics of the carbon fibers B1 were observed by analyzing the carbon fibers included in the precursor ya.

Specifically, the pulverized material 37 or the precursor ya was cut and was put into a crucible, and was heated at 550° C. for 1.5 hours under an oxygen-containing atmosphere so that a resin component was burnt to be removed. Remaining carbon fibers were put in water containing a surfactant, and were sufficiently agitated with ultrasonic vibration. An agitated dispersion liquid was randomly collected with a measuring spoon so that an evaluation sample was obtained, and lengths of 3000 fibers were measured by using Luzex AP which is an image analysis apparatus made by Nireco corporation.

In relation to the extracted carbon fibers, the number-average fiber length (Ln) and the weight-average fiber length (Lw) were obtained for the carbon fibers A1 and the carbon fibers B1 by using Equations (4) and (5).

(2) Analysis of Fiber Bundle (2-1) Carbon Fibers A1 Included in Thermoplastic Resin Layer X1

A square material with 100 mm×100 mm is cut out of the thermoplastic resin layer X1, the square material is heated at 500° C. for an hour in an air atmosphere so that a resin component is burnt to be removed, remaining carbon fibers are observed with an optical microscope, and the average number $N(A)_{ave}$ of fibers of a flow unit of the carbon fibers is calculated.

If a width and a height of the flow unit is approximately $D_A$, the average number of fibers is 1. Approximate multiples of the average fiber diameter $(D_A)$ were derived on the basis of the representative width and the representative histogram of the flow unit so that the average number $N(A)_{ave}$ of fibers of the flow unit was obtained. 100 flow units of the carbon of fibers were selected at random, and an average value measured through the operation was employed.

(2-2) Carbon Fiber Bundle B1b Included in Thermoplastic Resin Layer Y1

Fiber bundle analysis of the carbon fiber bundle B1b was performed as follows.

All fiber bundles are extracted from the precursor ya with tweezers, and the number of bundles $(I_B)$ of the carbon fiber bundle B1b, and a length $(Li_B)$ and mass $(Wi_B)$ of each fiber bundle are measured and are recorded.

Small fiber bundles to the extent to which the fiber bundles cannot be extracted with the tweezers are collected last, and the mass thereof is measured $(Wk_B)$. A balance which can measure mass up to $\frac{1}{100}$ mg is used. A critical number of single fiber is calculated on the basis of the average fiber diameter $(D_B)$ of the carbon fibers B1 included in the precursor ya, and the carbon fibers are divided into the carbon fiber bundle B1b equal to or larger than the critical number of single fiber and other single fiber and the like B1a.

A method of obtaining the average number $(N_B)$ of fibers of the carbon fiber bundle B1b is as follows.

The number $(Ni_B)$ of fibers in the carbon fiber bundle B1b is obtained from the following Equation on the basis of the tex $(F_B)$ of the strand in use.

$$Ni_B = Wi_B/(Li_B \times F_B)$$

The average number $(N_B)$ of fibers in the carbon fiber bundle B1b is obtained from the following Equation on the basis of the number of bundles $(I_B)$ of the carbon fiber bundle B1b.

$$N_B = \Sigma Ni_B/I_B$$

A proportion $(VR_B)$ of the carbon fibers B1 of the carbon fiber bundle B1b to the whole amount of fibers is obtained according to the following Equation by using the density $(\rho_f)$ of the carbon fibers.

$$VR_B = \Sigma(Wi_B/\rho_f) \times 100/((Wk_B + \Sigma Wi_B)/\rho_f)$$
$$= \Sigma(Wi_B) \times 100/(Wk_B + \Sigma Wi_B)$$

(2-3) Average Number $N(B)_{ave}$ of Fibers of Carbon Fibers B1 Included in Thermoplastic Resin Layer Y1

A square material with 100 mm×100 mm was cut out of the thermoplastic resin layer Y1, the square material was heated at 500° C. for an hour in an air atmosphere so that a resin component was burnt to be removed, remaining carbon fibers are observed with an optical microscope, and the following operation was performed on 100 flow units which were selected at random from the carbon fibers.

When the carbon fibers were observed with the optical microscope, carbon fiber bundle widths were sorted into fibers of 0.3 mm or less, 0.3 mm to 0.6 mm, 0.6 mm to 0.9 mm, 0.9 mm to 1.2 mm, 1.2 mm to 1.5 mm, and 1.5 mm or more, and a ratio of each corresponding fiber bundle was observed. The average number of fibers of each division was calculated on the basis of a median of the sorted fiber bundle width and a thickness (about 0.05 mm) of the fiber bundle, and a sum of average numbers of fibers of the respective divisions was used as the average number $N(B)_{ave}$ of fibers of a flow unit of the carbon fibers.

(3) Analysis of Fiber Volume Fraction (Vf) in Material x1 (Thermoplastic Resin Layer X1) and Material y1 (Thermoplastic Resin Layer Y1)

Square materials with 100 mm×100 mm were cut out of the material x1 and the material y1, and each weight $w_0$ (g) was measured. Next, the cut materials were heated at 500° C. for an hour in an air atmosphere so that a resin component was burnt to be removed, and a weight $W_1$ (g) of remaining carbon fibers was measured. Here, a fiber areal weight $(g/m^2)$ of the carbon fibers included in the thermoplastic resin layers X1 and Y1 are derived from the weight $W_1$ (g) of the carbon fibers.

A fiber weight fraction (Wf) was obtained by using the following Equation (9). All measurements were performed at n=3, and an average value thereof was used.

$$\text{Waveform} = (\text{weight } W_1 \text{ of carbon fibers})/(\text{weight } W_0 \text{ of thermoplastic resin layer}) \times 100 \quad (9)$$

Next, the fiber volume fraction (Vf) was calculated by using the specific gravity of each component (refer to Equation (10)).

Generally, the fiber volume fraction (Vf) and the fiber weight fraction (Wf) satisfy the following Equation (10). Here, $\rho_f$ indicates the density of fibers, and $\rho_m$ indicates the density of the resin.

$$1/Vf = 1 + \rho_f/\rho_m(1/Wf - 1) \quad (10)$$

(4) Physical Property Evaluation (Tension and Bending Test)

(4-1) Tension

A test piece was cut out of a horizontal portion of a molded article (a molding material depending on cases) or a thin-walled molded article by using a water jet device, and the tension test was performed by using the all-purpose tester 5982R4407 made by Instron company with reference to JIS K 7164. A shape of the test piece was an A type test piece. A discharge between chucks was 115 mm, and a test speed was 2 mm/min.

(4-2) Bending

Regarding the bending test, a test piece was cut out in the same manner, and values were measured by using the bending tester 5966 made by Instron company with reference to JIS K7017. A shape of the test piece was an A type test piece. A ratio $(L_S/D_t)$ between an inter-evaluation point distance $(L_S)$ and a plate thickness $(D_t)$ was 40, and the strain rate was 1%/min. A thickness error of the created molding material can be disregarded through such measurement. Evaluation results are represented as values relative to 100 of Comparative Example 1.

(5) Analysis of Fiber Orientation in Molded Article

A test piece was cut out of a molded article, a tension test was performed with any direction of the molded article and a direction orthogonal to the direction as references so that tensile moduli were measured, and a ratio (Eδ) obtained by dividing a greater value of the measured tensile moduli by a smaller value was measured. A material becomes more excellent in isotropy as the modulus ratio becomes closer to 1. In the present example, in a case where the modulus ratio is equal to or less than 1.3, it is determined that a material is isotropic.

(6) Flow Characteristic

Figure 11:
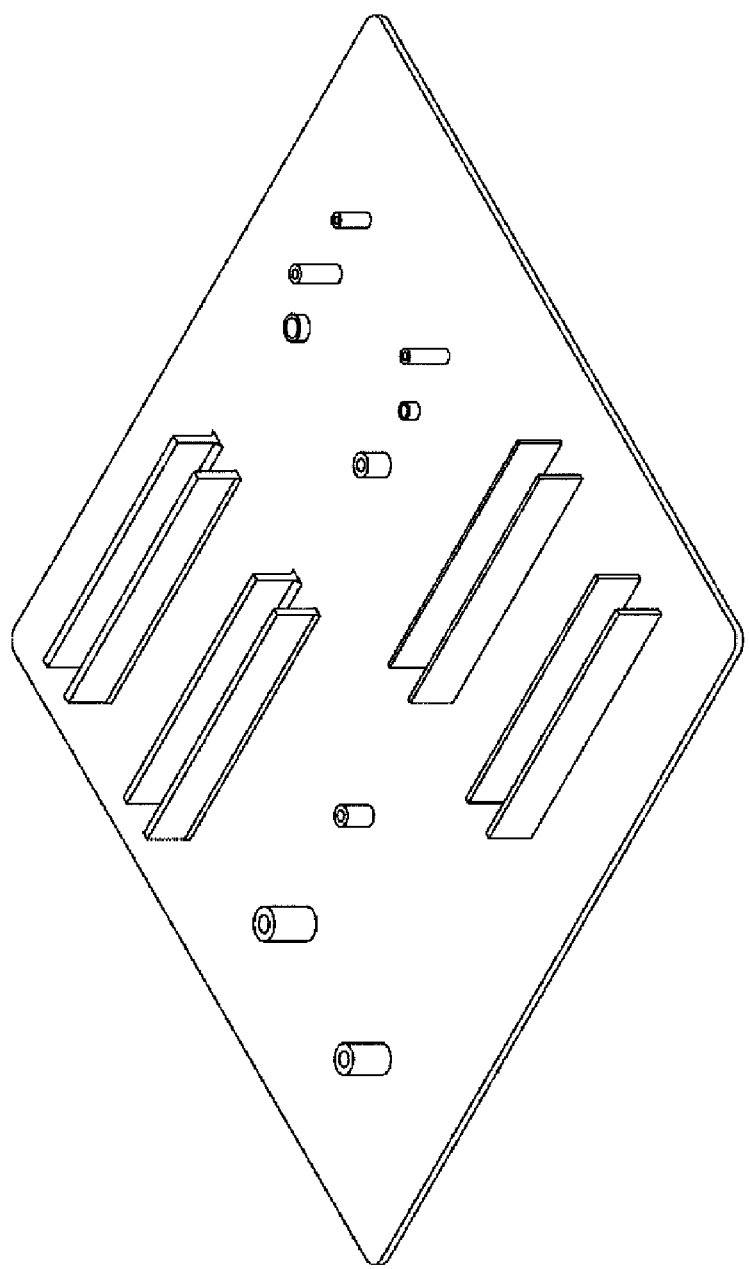
FIG. 11 is a schematic diagram illustrating a molded article using the molding material of the present invention.
Figure 12:
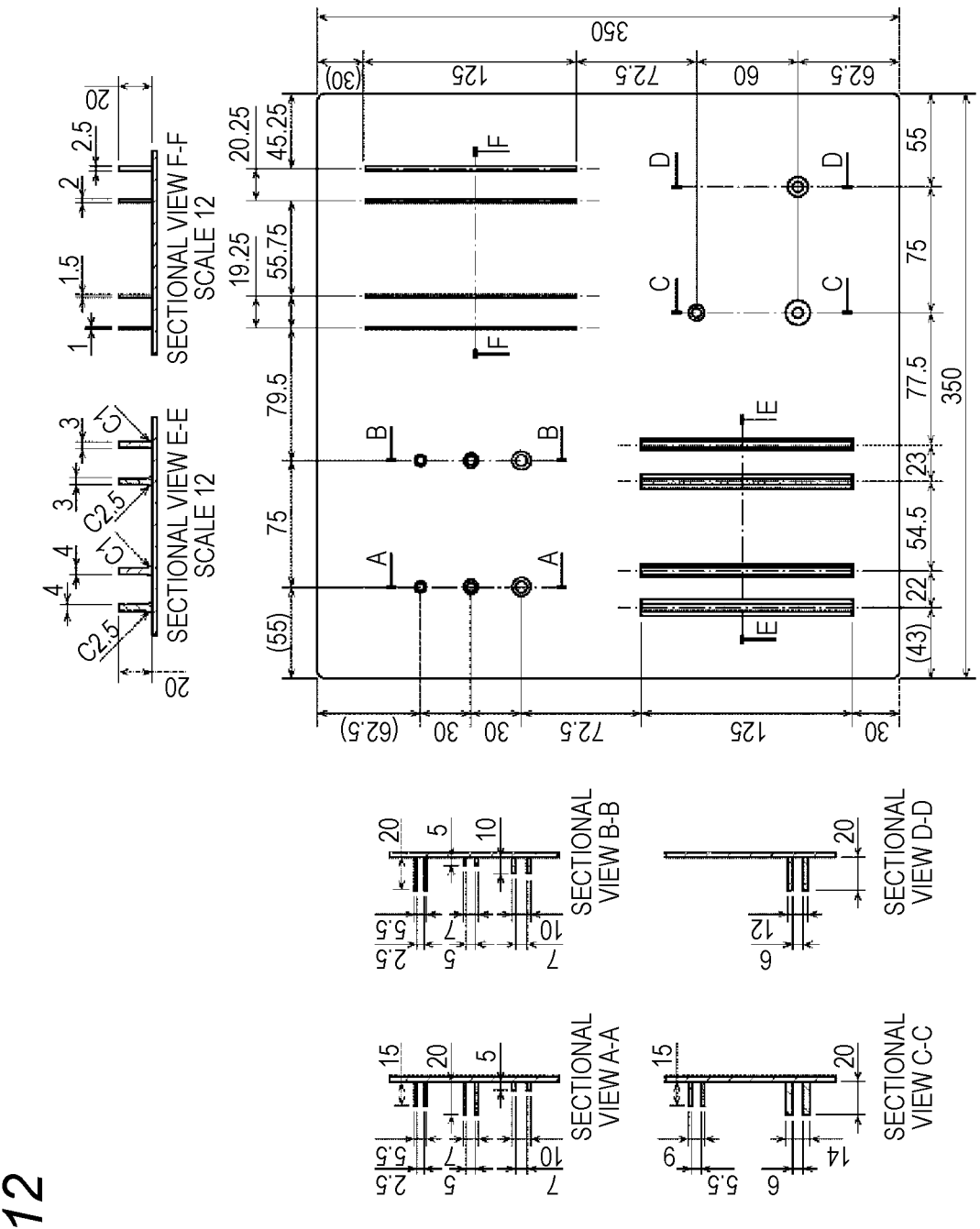
FIG. 12 is an explanatory diagram illustrating dimensions of the molded article.

Regarding the flow characteristic, a test was performed in order to form ribs and bosses as illustrated in FIGS. 11 and 12 in the thermoplastic resin layer Y1 (in only Comparative Example 2, a thermoplastic resin layer X1c) by heating a molding material to a state in which a thermoplastic resin included therein is softened, disposing the molding material in a mold with a lower temperature than the temperature of the molding material (so-called cold press), and pressing the molding material at pressure of 5 MPa for 60 seconds, and the fluidity (F) was calculated according to the following procedure.

i) The fiber volume fraction (Vf) of a molded article (provided with the ribs and bosses) was measured so that the density ($\rho_a$) of the molded article was calculated.

ii) A molded article weight (Wm) was measured (Wm is equivalent to the weight of the molding material).

iii) A molded article volume (Vm) was calculated (Vm=Wm/$\rho_a$) by using Wm and the density ($\rho_a$).

iv) A thickness (tb) of a horizontal portion of the molded article was measured so that a volume (Vb) of the horizontal portion (other than the ribs and bosses in FIG. 11) of the molded article was calculated.

v) A volume (Vz) of the rib and boss portions of the molded article was calculated by subtracting Vb from Vm (Vz=Vm−Vb).

vi) A value obtained by Vz by Vm was used as the fluidity (F) (F=Vz/Vm).

In addition, evaluation was performed by a ratio relative to Comparative Example 1 when the fluidity F calculated on the basis of a boss height in Comparative Example 1 is 100. For example, in Tables 1, 2 and 3, the fluidity (F) of 150 is 1.5 times the fluidity (F) in Comparative Example 1, and indicates that the flow characteristic is more favorable than in Comparative Example 1.

(7) Outflow Property of Thermoplastic Resin Layer X1

Evaluation of an outflow property was performed in order to observe whether or not the thermoplastic resin layer X1 flowed out of an end of the thermoplastic resin layer Y1 when press molding was performed in a state in which the ends of the thermoplastic resin layer X1 and the thermoplastic resin layer Y1 were aligned.

Figure 13:
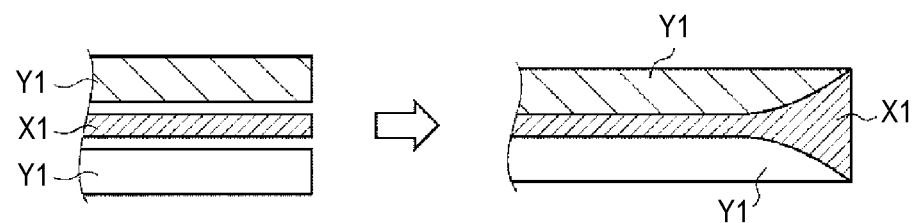
FIG. 13 is a trial examination diagram in a case where a thermoplastic resin layer Y remains at an end of a molded article.

Excellent: the thermoplastic resin layer Y1 with a long fiber length was formed at all ends of the molded article (for example, a state illustrated in FIG. 13).

Good: the thermoplastic resin layer Y1 was not formed at some of the ends of the molded article, but the thermoplastic resin layer Y1 was formed at least at a half or more of the ends of the molded article.

Better: the thermoplastic resin layer Y1 was formed at some of the ends of the molded article, but the thermoplastic resin layer Y1 was not formed at most of the ends of the molded article.

Bad: the thermoplastic resin layer X1 with a short fiber length was formed at all of the ends (for example, a state illustrated in FIG. 14).

2. Example

Carbon fibers used in Example and the comparative example are all PAN-based carbon fibers. Thermoplastic resins used in Example and the comparative example are all polyamide 6 (having the melting point of 225° C. and the thermal decomposition temperature (in air) of 300° C.).

Molding materials related to Examples 1 to 4, 7 to 12, and 15 have a three-layered structure as shown in Tables 1 and 2. The thermoplastic resin layer X1 (indicated by "X" in the tables) is used an intermediate layer, and the thermoplastic resin layer Y1 (indicated by "Y" in the tables) is used as a front layer and a rear layer. Each of the molding materials has a horizontal width of 350 mm, and a vertical width of 350 mm, in a plan view. A thickness of the molding material having the three-layered structure is 3 mm.

The molding material related to Example 5 has a five-layered structure as shown in Table 1, and the thermoplastic resin layer X1 (indicated by "X" in the tables) and the thermoplastic resin layer Y1 (indicated by "Y" in the tables) are stacked in order of Y/X/Y/X/Y. The molding material has a horizontal width of 350 mm, and a vertical width of 350 mm, in a plan view. A thickness of the molding material having the five-layered structure is 3 mm.

The molding material related to Example 6 has a four-layered structure as shown in Table 1, and the thermoplastic resin layer X1 (indicated by "X" in the tables) and the thermoplastic resin layer Y1 (indicated by "Y" in the tables) are stacked in order of Y/X/X/Y. The molding material has a horizontal width of 350 mm, and a vertical width of 350 mm, in a plan view. A thickness of the molding material having the four-layered structure is 3.1 mm.

The molding material related to Example 13 has a three-layered structure as shown in Table 2, and the thermoplastic resin layer X1 (indicated by "X" in the tables) is used an intermediate layer, and the thermoplastic resin layer Y1 (indicated by "Y" in the tables) is used as a front layer and a rear layer. The molding material has a horizontal width of 350 mm, and a vertical width of 350 mm, in a plan view. A thickness of the molding material having the three-layered structure is 3.0 mm.

Details of configurations of the thermoplastic resin layers of the molding materials in respective Examples are illustrated in Tables 1, 2 and 3.

Table 3 shows configurations of thermoplastic resin layers of molding materials in comparative examples. Each of the molding materials in the comparative examples has a horizontal width of 350 mm, and a vertical width of 350 mm, in a plan view.

(1) Example 1

(1-1) Preparation of Thermoplastic Resin Layer X1

Regarding the thermoplastic resin layer X1, the material x1 was prepared by using a pulverized material obtained by pulverizing a sheet material manufactured in a method similar to the manufacturing method described in (1-1-3) Manufacturing Example 3 of 2. (1), (1-1), as the resin composition in the manufacturing method described in (1-1-1) Manufacturing Example 1 of 2. (1), (1-1). Specific content is as follows.

The carbon fiber "Tenax" (registered trademark) STS40-24KS (average fiber diameter $D_A$: 7 μm, fiber width: 10 mm, tensile strength: 4000 MPa, density $\rho_f$: 1.75 g/cm³ (0.0018 g/mm³), and sectional area $(\pi \times (D_A/2)^2)$ of carbon fiber: 38.5 μm²) manufactured by Toho Tenax Co., Ltd. was used as a carbon fiber, and the carbon fiber was widened to be used with a width of 20 mm.

A pitch of blades of the cutting device was 12 mm.

A created precursor had a carbon fiber areal weight of 1440 g/m² and a nylon resin fiber areal weight of 1700 g/m², and the procedure was heated at 4 MPa for three minutes in a press device heated to 260° C., so that a sheet material (composite material) having a thickness of 2.3 mm was obtained.

A pulverized material was obtained by finely pulverizing the obtained sheet material by using a large-size low-speed pulverizing machine. Characteristics of the carbon fibers A1 included in the pulverized material were measured, that is, the fiber length distribution was within a range from 0.01 mm to 2.3 mm, the number-average fiber length ($Ln_A$) was 0.22 mm, and the weight-average fiber length ($Lw_A$) was 0.55 mm. The average number $N(A)_{ave}$ of fibers was 1.1. These results are shown in Table 1.

The obtained pulverized material was heated at 4 MPa for three minutes in a press device heated to 260° C., so that the sheet-shaped material x1 having a thickness of 0.3 mm was obtained. An ultrasonic flaw detection test was performed on the obtained material x1, and a non-impregnated portion or a void was not found. The fiber volume fraction (Vf) in the obtained material x1 was 35 Vol %, and the carbon fiber areal weight was 188 g/m².

(1-2) Preparation of Thermoplastic Resin Layer Y1

The carbon fiber "Tenax" (registered trademark) STS40-24KS (average fiber diameter $(D_B)$: 7 μm, fiber width: 10 mm, density $\rho_f$: 1.75 g/cm³ (0.0018 g/mm³), and sectional area $(\pi \times (D_B/2)^2)$ of carbon fiber: 38.5 μm²) manufactured by Toho Tenax Co., Ltd. was used as a strand, and the carbon fiber was widened to be used with a width of 20 mm. A rotary cutter was used in a cutting device for the carbon fibers B1b.

Adjustment was performed so that a fiber areal weight for the whole amount of carbon fibers becomes 850 g/m², and a nylon resin fiber areal weight becomes 1000 g/m², and thus the precursor ya of the material y1 was obtained.

A fiber length of the carbon fibers B1 included in the obtained precursor ya was measured as 20 mm which was a constant length. Regarding a method of cutting the strand, as described above, since a pitch of the blades of the rotary cutter was constant, lengths of the carbon fibers B1 included in the precursor can be made fixed lengths, and thus both of the number-average fiber length ($Ln_B$) and the weight-average fiber length ($Lw_B$) were 20 mm.

A proportion of the carbon fiber bundle B1b and the average number $(N_B)$ of fibers were examined for the obtained precursor ya, that is, a critical number of single fiber defined in Equation (2) was 86, the proportion of the carbon fiber bundle B1b to the whole amount of the precursor ya was 86 Vol %, and the average number $(N_B)$ of fibers was 1500. The fiber volume fraction (Vf) in the thermoplastic resin layer Y1 was 35 Vol %. In addition, the average number $N(B)_{ave}$ of fibers was 1150.

The obtained precursor was heated at 4 MPa for three minutes in a press device heated to 260° C., so that the plate-shaped material y1 having a thickness of 1.35 mm was obtained. The carbon fiber areal weight was 850 g/m². An ultrasonic flaw detection test was performed on the obtained material y1, and a non-impregnated portion or a void was not found.

(1-3) Stacking of Thermoplastic Resin Layer X1 and Thermoplastic Resin Layer Y1

The obtained materials x1 and y1 were installed in a mold adjusted to 260° C. so that the thermoplastic resin layer X1 and the thermoplastic resin layer Y1 form a three-layered structure of Y/X/Y, and were then heated at 4.0 MPa for three minutes, and the temperature of the mold was reduced to 40° C. in a pressing state so that the molding material 1 having a three-layered structure with a thickness (Dt) of 3 mm was obtained. A proportion (weight proportion) of the thermoplastic resin layer X1 to the molding material 1 was 10 wt % (refer to Table 1).

This molding material after being heated and pressed also corresponds to a plate-shaped molded article. Hereinafter, in other words, evaluation of a molding material is evaluation of a plate-shaped molded article.

(1-4) Evaluation of Molding Material

Tensile moduli of the obtained plate-shaped molding material in directions of 0 degree and 90 degrees were measured, that is, a ratio (Eδ) between the moduli was 1.03, and a material was obtained in which there is almost no fiber orientation, and isotropy is maintained. In addition, the molding material was heated at 500° C. for about an hour so that the resin was removed, and fiber lengths of the carbon fibers A1 and the carbon fibers B1 included in each layer X1 and Y1, a proportion of the carbon fiber bundle B1b, an average number $(N_B)$ of fibers and an average number $N(B)_{ave}$ of fibers included in the carbon fiber bundle B1b, and an average number $N(A)_{ave}$ of fibers included in the carbon fibers A1 were examined. As a result, there were no differences from the measurement results of the precursors of the materials x1 and y1.

In order to examine the flow characteristic of the obtained molding material, evaluation was performed on the basis of the above-described flow characteristic evaluation method.

Various characteristics related to Example 1 are as shown in Table 1. In other words, the tensile strength is 95% relative to Comparative Example 1, and the tensile modulus is 95% relative to Comparative Example 1. The bending strength is the same as that in Comparative Example 1 (100% relative to Comparative Example 1), and the flexural modulus is 95% relative to Comparative Example 1. The fluidity (F) is 150% relative to Comparative Example 1.

(2) Example 2

The material x1 and the material y1 were prepared and were stacked in order of Y/X/Y in the same manner as in Example 1, except that the material x1 is prepared so that the thermoplastic resin layer X1 is 0.6 mm thick, and the material y1 is prepared so that the thermoplastic resin layer Y1 is 1.2 mm thick. In other words, a proportion of the thermoplastic resin layer X1 to the molding material was 20 wt % (refer to Table 1).

Various characteristics related to Example 2 are as shown in Table 1. In other words, the tensile strength is 95% relative to Comparative Example 1, and the tensile modulus is 90% relative to Comparative Example 1. The bending strength is 95% relative to Comparative Example 1, and the flexural modulus is 95% relative to Comparative Example 1. The fluidity (F) is 500% relative to Comparative Example 1.

(3) Example 3

The material x1 and the material y1 were prepared and were stacked in order of Y/X/Y in the same manner as in Example 1, except that the material x1 is prepared so that the thermoplastic resin layer X1 is 1.0 mm thick, and the material y1 is prepared so that the thermoplastic resin layer Y1 is 1.0 mm thick. In other words, a proportion of the thermoplastic resin layer X1 to the molding material was 40 wt %.

Various characteristics related to Example 3 are as shown in Table 1. In other words, the tensile strength is 75% relative to Comparative Example 1, and the tensile modulus is 85% relative to Comparative Example 1. The bending strength is 90% relative to Comparative Example 1, and the flexural modulus is 85% relative to Comparative Example 1. The fluidity (F) is 600% relative to Comparative Example 1.

(4) Example 4

The material x1 and the material y1 were prepared and were stacked in order of Y/X/Y in the same manner as in Example 1, except that the material x1 is prepared so that the thermoplastic resin layer X1 is 1.5 mm thick, and the material y1 is prepared so that the thermoplastic resin layer Y1 is 0.75 mm thick. In other words, a proportion of the thermoplastic resin layer X1 to the molding material was 50 wt %.

Various characteristics related to Example 4 are as shown in Table 1. In other words, the tensile strength is 70% relative to Comparative Example 1, and the tensile modulus is 80% relative to Comparative Example 1. The bending strength is 90% relative to Comparative Example 1, and the flexural modulus is 85% relative to Comparative Example 1. The fluidity (F) is 800% relative to Comparative Example 1.

(5) Example 5

The material x1 and the material y1 were prepared and were stacked in order of Y/X/Y/X/Y in the same manner as in Example 1, except that the material y1 is prepared so that the thermoplastic resin layer Y1 is 0.8 mm thick.

(6) Example 6

The material x1 and the material y1 were prepared and were stacked in order of Y/X/X/Y in the same manner as in Example 1, except that the material x1 is prepared so that the thermoplastic resin layer X1 is 1.1 mm thick, and the material y1 is prepared so that the thermoplastic resin layer Y1 is 0.45 mm thick. In other words, a proportion of the thermoplastic resin layer X1 to the molding material was 70 wt %.

Various characteristics related to Example 6 are as shown in Table 1. In other words, the tensile strength is 50% relative to Comparative Example 1, and the tensile modulus is 50% relative to Comparative Example 1. The bending strength is 70% relative to Comparative Example 1, and the flexural modulus is 65% relative to Comparative Example 1. The fluidity (F) is 850% relative to Comparative Example 1.

(7) Example 7

The material x1 and the material y1 were prepared and were stacked in order of Y/X/Y in the same manner as in Example 1, except that the material x1 is prepared so that the thermoplastic resin layer X1 is 0.6 mm thick, and the material y1 is prepared so that each of the number-average fiber length and the weight-average fiber length of the carbon fibers B1 is 15 mm, and the thermoplastic resin layer Y1 is 1.2 mm thick. In other words, a proportion of the thermoplastic resin layer X1 to the molding material was 20 wt %.

Various characteristics related to Example 7 are as shown in Table 1. In other words, the tensile strength is 85% relative to Comparative Example 1, and the tensile modulus is 90% relative to Comparative Example 1. The bending strength is 95% relative to Comparative Example 1, and the flexural modulus is 95% relative to Comparative Example 1. The fluidity (F) is 500% relative to Comparative Example 1.

(8) Example 8

The material x1 and the material y1 were prepared and were stacked in order of Y/X/Y in the same manner as in Example 1, except that the material x1 is prepared so that the thermoplastic resin layer X1 is 0.6 mm thick, and the material y1 is prepared so that each of the number-average fiber length and the weight-average fiber length of the carbon fibers B1 is 10 mm, and the thermoplastic resin layer Y1 is 1.2 mm thick. In other words, a proportion of the thermoplastic resin layer X1 to the molding material was 20 wt %.

Various characteristics related to Example 8 are as shown in Table 2. In other words, the tensile strength is 85% relative to Comparative Example 1, and the tensile modulus is 90% relative to Comparative Example 1. The bending strength is 95% relative to Comparative Example 1, and the flexural modulus is 95% relative to Comparative Example 1. The fluidity (F) is 500% relative to Comparative Example 1.

(9) Example 9

The material x1 and the material y1 were prepared and were stacked in order of Y/X/Y in the same manner as in Example 1, except that the material x1 is prepared so that the thermoplastic resin layer X1 is 0.6 mm thick, and the material y1 is prepared so that the average number ($N_B$) of fibers is 2400, the average number $N(B)_{ave}$ of fibers is 2000, a proportion of the carbon fiber bundle B1$b$ to the whole amount of fibers of the precursor ya is 95 Vol %, and the thermoplastic resin layer Y1 is 1.2 mm thick. In other words, a proportion of the thermoplastic resin layer X1 to the molding material was 20 wt %.

Various characteristics related to Example 9 are as shown in Table 2. In other words, the tensile strength is 80% relative to Comparative Example 1, and the tensile modulus is 85% relative to Comparative Example 1. The bending strength is 90% relative to Comparative Example 1, and the flexural modulus is 90% relative to Comparative Example 1. The fluidity (F) is 550% relative to Comparative Example 1.

(10) Example 10

The material x1 and the material y1 were prepared and were stacked in order of Y/X/Y in the same manner as in Example 1, except that the material x1 is prepared so that the thermoplastic resin layer X1 is 0.6 mm thick, and the material y1 is prepared so that each of the number-average fiber length and the weight-average fiber length of the carbon fibers B1 is 15 mm, the average number ($N_B$) of fibers is 2400, the average number $N(B)_{ave}$ of fibers is 2000, a proportion of the carbon fiber bundle B1$b$ to the whole amount of fibers of the precursor ya is 95 Vol %, and the thermoplastic resin layer Y1 is 1.2 mm thick. In other words, a proportion of the thermoplastic resin layer X1 to the molding material was 20 wt %.

Various characteristics related to Example 9 are as shown in Table 2. In other words, the tensile strength is 80% relative to Comparative Example 1, and the tensile modulus is 85% relative to Comparative Example 1. The bending strength is 90% relative to Comparative Example 1, and the flexural modulus is 90% relative to Comparative Example 1. The fluidity (F) is 550% relative to Comparative Example 1.

(11) Example 11

The material x1 and the material y1 were prepared and were stacked in order of Y/X/Y in the same manner as in Example 1, except that the material x1 is prepared so that the thermoplastic resin layer X1 is 0.6 mm thick, and the material y1 is prepared so that the average number $(N_B)$ of fibers is 450, the average number $N(B)_{ave}$ of fibers is 400, a proportion of the carbon fiber bundle B1$b$ to the whole amount of fibers of the precursor ya is 40 Vol %, and the thermoplastic resin layer Y1 is 1.2 mm thick. In other words, a proportion of the thermoplastic resin layer X1 to the molding material was 20 wt %.

Various characteristics related to Example 9 are as shown in Table 2. In other words, the tensile strength is 80% relative to Comparative Example 1, and the tensile modulus is 85% relative to Comparative Example 1. The bending strength is 90% relative to Comparative Example 1, and the flexural modulus is 90% relative to Comparative Example 1. The fluidity (F) is 120% relative to Comparative Example 1.

(12) Example 12

The material x1 and the material y1 were prepared and were stacked in order of Y/X/Y in the same manner as in Example 1, except that the material x1 is prepared so that the number-average fiber length of the carbon fibers A1 is 0.55 mm, the weight-average fiber length of the carbon fibers A1 is 0.78 mm, and the thermoplastic resin layer X1 is 0.6 mm thick, and the material y1 is prepared so that the thermoplastic resin layer Y1 is 1.2 mm thick. In other words, a proportion of the thermoplastic resin layer X1 to the molding material was 20 wt %.

Various characteristics related to Example 12 are as shown in Table 2. In other words, the tensile strength is 85% relative to Comparative Example 1, and the tensile modulus is 90% relative to Comparative Example 1. The bending strength is 95% relative to Comparative Example 1, and the flexural modulus is 95% relative to Comparative Example 1. The fluidity (F) is 500% relative to Comparative Example 1.

(13) Example 13

The material x1 and the material y1 were prepared and were stacked in order of Y/X/Y in the same manner as in Example 1, except that the material x1 is prepared so that the number-average fiber length of the carbon fibers A1 is 0.1 mm, the weight-average fiber length of the carbon fibers A1 is 0.2 mm, and the thermoplastic resin layer X1 is 0.6 mm thick, and the material y1 is prepared so that each of the number-average fiber length and the weight-average fiber length of the carbon fibers B1 is 25 mm, the average number $(N_B)$ of fibers is 700, and the average number $N(B)_{ave}$ of fibers is 600. In other words, a proportion of the thermoplastic resin layer X1 to the molding material was 20 wt %.

Various characteristics related to Example 13 are as shown in Table 2. In other words, the tensile strength is 95% relative to Comparative Example 1, and the tensile modulus is 90% relative to Comparative Example 1. The bending strength is 95% relative to Comparative Example 1, and the flexural modulus is 95% relative to Comparative Example 1. The fluidity (F) is 350% relative to Comparative Example 1.

(14) Example 14

The material x1 and the material y1 were prepared and were stacked in order of Y/X/Y in the same manner as in Example 1, except that the material x1 is prepared so that the thermoplastic resin layer X1 is 0.6 mm thick, and the material y1 is prepared so that each of the number-average fiber length and the weight-average fiber length of the carbon fibers B1 is 10 mm, the average number $(N_B)$ of fibers is 6500, the average number $N(B)_{ave}$ of fibers is 6000, and the thermoplastic resin layer Y1 is 1.2 mm thick. In other words, a proportion of the thermoplastic resin layer X1 to the molding material was 20 wt %.

Various characteristics related to Example 14 are as shown in Table 2. In other words, the tensile strength is 70% relative to Comparative Example 1, and the tensile modulus is 75% relative to Comparative Example 1. The bending strength is 80% relative to Comparative Example 1, and the flexural modulus is 80% relative to Comparative Example 1. The fluidity (F) is 1000% relative to Comparative Example 1.

(15) Comparative Examples 1 and 2

Regarding the molding material 1$c$ related to Comparative Examples 1 and 2 described below, only one of the materials x1$c$ and y1$c$ for the thermoplastic resin layers X1$c$ and Y1$c$ is installed in a mold, and is then molded at 260° C. for three minutes at molding pressure of 4.0 MPa in the same manner as the molding material 1 related to Example 1 so as to become a molding material having a thickness (Dt) of 3 mm. A test piece for mechanical characteristics is cut out of the molding material so as to be manufactured, and a test for the flow characteristic is performed by using a molded article thereof.

The molding material 1$c$ related to Comparative Example 1 is formed of only the thermoplastic resin layer Y1$c$ (only the material y1$c$ is used) as shown in Table 3. In other words, the thermoplastic resin layer Y1$c$ in Comparative Example 1 is the same as the Y layer of the molding material in Example 1 except that the thickness thereof is 3 mm.

The molding material 1$c$ related to Comparative Example 2 is formed of only the thermoplastic resin layer X1$c$ (only the material x1$c$ is used) as shown in Table 3. In other words, the thermoplastic resin layer X1$c$ in Comparative Example 2 is the same as the X layer of the molding material in Example 1 except that the thickness thereof is 3 mm.

A plate described in Comparative Examples 1 and 2 has a rectangular shape in a plan view in the same manner as in Example 1, and a horizontal width is 350 mm, and a vertical width is 350 mm, in a plan view. The thickness (Dt) of the molding material 1$c$ is 3 mm. Results of the mechanical properties are shown in Table 3.

(16) Example 15

The material x1 and the material y1 were prepared and were stacked in order of Y/X/Y in the same manner as in Example 1, except that the material x1 is prepared so that the thermoplastic resin layer X1 is 0.6 mm thick, and the material y1 is prepared so that each of the number-average fiber length and the weight-average fiber length of the carbon fibers B1 is 4 mm, and the thermoplastic resin layer Y1 is 1.2 mm thick. In other words, a proportion of the thermoplastic resin layer X1 to the molding material was 20 wt %.

A ratio of the density parameter of the thermoplastic resin layer X1 to the density parameter of the thermoplastic resin layer Y1 in Example 15 is 3.14.

Various characteristics related to Example 15 are as shown in Table 2. In other words, the tensile strength is 40% relative to Comparative Example 1, and the tensile modulus is 40% relative to Comparative Example 1. The bending strength is 50% relative to Comparative Example 1, and the flexural modulus is 40% relative to Comparative Example 1. The fluidity (F) is 1400% relative to Comparative Example 1.

(17) Comparative Example 3

The material x1c and the material y1c were prepared and were stacked in order of Y/X/Y in the same manner as in Example 1, except that the material x1c is prepared so that the number-average fiber length of the carbon fibers A1c is 4 mm, the weight-average fiber length of the carbon fibers A1c is 1.2 mm, and the thermoplastic resin layer X1c is 0.6 mm thick, and the material y1c is prepared so that the thermoplastic resin layer Y1c is 1.2 mm thick. In other words, a proportion of the thermoplastic resin layer X1c to the molding material was 20 wt %.

Various characteristics related to Comparative Example 3 are as shown in Table 3. In other words, the tensile strength is 95% relative to Comparative Example 1, and the tensile modulus is 95% relative to Comparative Example 1. The bending strength is 95% relative to Comparative Example 1, and the flexural modulus is 95% relative to Comparative Example 1. The fluidity (F) is 100% relative to Comparative Example 1.

(18) Comparative Example 4

The material x1c and the material y1c were prepared and were stacked in order of Y/X/Y in the same manner as in Example 1, except that the material x1c is prepared so that the thermoplastic resin layer X1c is 0.6 mm thick, and the material y1c is prepared so that the average number $(N_B)$ of fibers is 210, the average number $N(B)_{ave}$ of fibers is 150, and the thermoplastic resin layer Y1c is 1.2 mm thick. In other words, a proportion of the thermoplastic resin layer X1c to the molding material was 20 wt %.

The density parameter of the thermoplastic resin layer Y1c in Comparative Example 4 is $2.4 \times 10^4$.

Various characteristics related to Comparative Example 4 are as shown in Table 3. In other words, the tensile strength is 115% relative to Comparative Example 1, and the tensile modulus is 115% relative to Comparative Example 1. The bending strength is 115% relative to Comparative Example 1, and the flexural modulus is 115% relative to Comparative Example 1. The fluidity (F) is 70% relative to Comparative Example 1.

(19) Comparative Example 5

The carbon fiber "Tenax" (registered trademark) STS40-24KS (average fiber diameter 7 μm, fiber width: 10 mm, density $\rho_f$: 1.75 g/cm$^3$, and sectional area $(\pi \times (D/2)^2)$ of carbon fiber: 38.5 μm$^2$) manufactured by Toho Tenax Co., Ltd. was cut by using a cartridge cutter, and thus a chopped carbon fiber bundle having a fiber length of 9 mm was obtained.

A 1.5 wt % aqueous solution of 100 liters of a surfactant ("n-Dodecylbenzenesufonic Acid Sodium Salt" (product name) manufactured by Wako Pure Chemical Industries, Ltd.) was agitated, and thus a whipped dispersion liquid was manufactured. The obtained chopped carbon fiber bundle 1 was put into the dispersion liquid so as to be agitated for ten minutes, flowed into a paper maker having a papermaking surface of 500 mm long×500 mm width, dehydrated through sucking, and dried for two hours at the temperature of 150° C., and thus a carbon fiber nonwoven fabric formed of carbon fibers was obtained.

The obtained carbon fiber nonwoven fabric was alternately stacked by using a polypropylene resin film, and thus a stacked body with a total of five layers was prepared. The stacked body was placed on a metallic tool plate with a release sheet interposed between, and a tool plate was further disposed thereon. As the release sheet, a Teflon (registered trademark) sheet (1 mm thick) was used. Next, the stacked body was disposed between heat board faces of a hydraulic press machine including the upper and lower heat board faces heated to 210° C., and was pressed at a surface pressure of 5 MPa. Next, the stacked body was conveyed to another hydraulic press machine controlled to have the temperature of 80° C. so as to be disposed between cooling boards, and underwent cooling press at a surface pressure of 5 MPa, and thus a comparative thermoplastic resin layer Y1c having the thickness of 0.5 mm, formed of the carbon fiber nonwoven fabric and the polypropylene resin, was obtained.

Next, a non-modified polypropylene resin of 90% by mass and an acid-modified polypropylene resin of 10% by mass were prepared, and underwent dry blending. The dry-blended product was melted and kneaded by using a two-axis extruder at 200° C., and then a chopped carbon fiber bundle having a fiber length of 6 mm, obtained by cutting the carbon fiber "Tenax" (registered trademark) STS40-24KS manufactured by Toho Tenax Co., Ltd. by using the cartridge cutter, was put thereinto via a re-feeder of the extruder so as to be kneaded with the product. The product was melted and kneaded, and was then extruded from a T-die.

Thereafter, the product was picked up by chill rolls whose temperature is 60° C. so as to be cooled and solidified, and thus a carbon fiber/polypropylene resin sheet having a thickness of 0.5 mm was obtained. The sheet was disposed on a metallic tool plate with a release sheet interposed therebetween, and a tool plate was further disposed thereon. As the release sheet, a Teflon (registered trademark) sheet (1 mm thick) was used. Next, the sheet was disposed between heat board faces of a hydraulic press machine including the upper and lower heat board faces heated to 210° C., and was pressed at a surface pressure of 5 MPa. Next, the stacked body was conveyed to another hydraulic press machine controlled to have the temperature of 80° C. so as to be disposed between cooling boards, and underwent cooling press at a surface pressure of 5 MPa, and thus a comparative thermoplastic resin layer X1c having the thickness of 2.0 mm and a fiber weight proportion of 33.3 wt %, formed of the carbon fiber nonwoven fabric and the polypropylene resin, was obtained.

Two obtained comparative thermoplastic resin layers Y1c (corresponding to one side) were used, a single comparative thermoplastic resin layer X1c was interposed therebetween, and press molding was performed thereon in the same manner as in Example 1. A result thereof is shown in Table 3.

TABLE 1

| | Sample name | | | | | | |
|---|---|---|---|---|---|---|---|
| | Example 1 | Example 2 | Example 3 | Example 4 | Example 5 | Example 6 | Example 7 |
| Number of layers | 3 | 3 | 3 | 3 | 5 | 3 | 3 |
| Configuration | Y/X/Y | Y/X/Y | Y/X/Y | Y/X/Y | Y/X/Y/X/Y | Y/X/Y | Y/X/Y |
| Proportion of X layer (X/X + Y): wt % | 10 | 20 | 40 | 50 | 20 | 70 | 20 |
| X layer | | | | | | | |
| Single layer thickness: mm | 0.3 | 0.6 | 1.2 | 1.5 | 0.3 | 1.1 | 0.6 |
| Number-average fiber length $Ln_A$: mm | 0.22 | 0.22 | 0.22 | 0.22 | 0.22 | 0.22 | 0.22 |
| Weight-average fiber length $Lw_A$: mm | 0.55 | 0.55 | 0.55 | 0.55 | 0.55 | 0.55 | 0.55 |
| Carbon fiber volume fraction $Vf_A$: % | 35 | 35 | 35 | 35 | 35 | 35 | 35 |
| Thermoplastic resin | PA6 | PA6 | PA6 | PA6 | PA6 | PA6 | PA6 |
| Carbon fiber areal weight: g/m$^2$ | 188 | 376 | 751 | 939 | 188 | 657 | 376 |
| Sectional area of carbon fibers: mm$^2$ | 0.000038 | 0.000038 | 0.000038 | 0.000038 | 0.000038 | 0.000038 | 0.000038 |
| Carbon fiber density ρf: g/mm$^3$ | 0.0018 | 0.0018 | 0.0018 | 0.0018 | 0.0018 | 0.0018 | 0.0018 |
| Average number $N_A$ of fibers: number | 1.1 | 1.1 | 1.1 | 1.1 | 1.1 | 1.1 | 1.1 |
| Density parameter $P_X$ | 398 | 398 | 398 | 398 | 398 | 398 | 398 |
| Y layer | | | | | | | |
| Single layer thickness: mm | 1.35 | 1.2 | 0.9 | 0.75 | 0.8 | 0.45 | 1.2 |
| Number-average fiber length $Ln_B$: mm | 20 | 20 | 20 | 20 | 20 | 20 | 15 |
| Weight-average fiber length $Lw_B$: mm | 20 | 20 | 20 | 20 | 20 | 20 | 15 |
| Carbon fiber volume fraction $Vf_B$: % | 35 | 35 | 35 | 35 | 35 | 35 | 35 |
| Thermoplastic resin | PA6 | PA6 | PA6 | PA6 | PA6 | PA6 | PA6 |
| Carbon fiber areal weight: g/m$^2$ | 850 | 756 | 567 | 472 | 907 | 283 | 756 |
| Sectional area of carbon fibers: mm$^2$ | 0.000038 | 0.000038 | 0.000038 | 0.000038 | 0.000038 | 0.000038 | 0.000038 |
| Carbon fiber density ρf: g/mm$^3$ | 0.0018 | 0.0018 | 0.0018 | 0.0018 | 0.0018 | 0.0018 | 0.0018 |
| Average number $N_B$ of fibers: number | 1500 | 1500 | 1500 | 1500 | 1500 | 1500 | 1500 |
| Proportion of carbon fiber bundle (Bb) | 86 Vol % | 86 Vol % | 86 Vol % | 86 Vol % | 86 Vol % | 86 Vol % | 86 Vol % |
| Average number $N(B)_{ave}$ of fibers: number | 1150 | 1150 | 1150 | 1150 | 1150 | 1150 | 1150 |
| Density parameter $P_Y$ | 3161 | 3161 | 3161 | 3161 | 5691 | 3161 | 1778 |
| $P_X/P_Y$ | 0.13 | 0.13 | 0.13 | 0.13 | 0.07 | 0.13 | 0.22 |
| Evaluation of molding material | | | | | | | |
| thickness Dt: mm | 3 | 3 | 3 | 3 | 3 | 3 | 3 |
| Tensile characteristics | | | | | | | |
| Strength | 95 | 95 | 75 | 70 | 90 | 50 | 85 |
| Modulus | 95 | 90 | 85 | 80 | 85 | 50 | 90 |
| Bending characteristics | | | | | | | |
| Strength | 100 | 95 | 90 | 90 | 95 | 70 | 95 |
| Modulus | 95 | 95 | 85 | 85 | 95 | 65 | 95 |
| Flow characteristic | | | | | | | |
| Fluidity F | 150 | 500 | 600 | 800 | 450 | 850 | 500 |
| Outflow property of thermoplastic resin layer (X) | excellent | excellent | excellent | good | good | better | excellent |

* Tensile characteristics, bending characteristics, and flow characteristic are represented as values relative to 100 of Comparative Example 1.

TABLE 2

| | Sample name | | | | | | | |
|---|---|---|---|---|---|---|---|---|
| | Example 8 | Example 9 | Example 10 | Example 11 | Example 12 | Example 13 | Example 14 | Example 15 |
| Number of layers | 3 | 3 | 3 | 3 | 5 | 3 | 3 | 3 |
| Configuration | Y/X/Y | Y/X/Y | Y/X/Y | Y/X/Y | Y/X/Y | Y/X/Y | Y/X/Y | Y/X/Y |
| Proportion of X layer (X/X + Y): wt % | 20 | 20 | 20 | 20 | 20 | 20 | 20 | 20 |
| X layer | | | | | | | | |
| Single layer thickness: mm | 0.6 | 0.6 | 0.6 | 0.6 | 0.6 | 0.6 | 0.6 | 0.6 |
| Number-average fiber length $Ln_A$: mm | 0.22 | 0.22 | 0.22 | 0.22 | 0.55 | 0.1 | 0.22 | 0.22 |
| Weight-average fiber length $Lw_A$: mm | 0.55 | 0.55 | 0.55 | 0.55 | 0.78 | 0.2 | 0.55 | 0.55 |
| Carbon fiber volume fraction $Vf_A$: % | 35 | 35 | 35 | 35 | 35 | 35 | 35 | 35 |
| Thermoplastic resin | PA6 | PA6 | PA6 | PA6 | PA6 | PA6 | PA6 | PA6 |
| Carbon fiber areal weight: g/m$^2$ | 376 | 376 | 376 | 376 | 376 | 376 | 376 | 376 |
| Sectional area of carbon fibers: mm$^2$ | 0.000038 | 0.000038 | 0.000038 | 0.000038 | 0.000038 | 0.000038 | 0.000038 | 0.000038 |

TABLE 2-continued

| | Example 8 | Example 9 | Example 10 | Example 11 | Example 12 | Example 13 | Example 14 | Example 15 |
|---|---|---|---|---|---|---|---|---|
| Carbon fiber density ρf: g/mm³ | 0.0018 | 0.0018 | 0.0018 | 0.0018 | 0.0018 | 0.0018 | 0.0018 | 0.0018 |
| Average number $N_A$ of fibers: number | 1.1 | 1.1 | 1.1 | 1.1 | 1.1 | 1.1 | 1.1 | 1.1 |
| Density parameter $P_X$ | 398 | 398 | 398 | 398 | 2485 | 82 | 398 | 398 |
| Y layer | | | | | | | | |
| Single layer thickness: mm | 1.2 | 1.2 | 1.2 | 1.2 | 1.2 | 1.2 | 1.2 | 1.2 |
| Number-average fiber length $Ln_B$: mm | 10 | 20 | 15 | 20 | 20 | 25 | 10 | 4 |
| Weight-average fiber length $Lw_B$: mm | 10 | 20 | 15 | 20 | 20 | 25 | 10 | 4 |
| Carbon fiber volume fraction $Vf_B$: % | 35 | 35 | 35 | 35 | 35 | 35 | 35 | 35 |
| Thermoplastic resin | PA6 | PA6 | PA6 | PA6 | PA6 | PA6 | PA6 | PA6 |
| Carbon fiber areal weight: g/m² | 756 | 756 | 756 | 756 | 756 | 850 | 756 | 756 |
| Sectional area of carbon fibers: mm² | 0.000038 | 0.000038 | 0.000038 | 0.000038 | 0.000038 | 0.000038 | 0.000038 | 0.000038 |
| Carbon fiber density ρf: g/mm³ | 0.0018 | 0.0018 | 0.0018 | 0.0018 | 0.0018 | 0.0018 | 0.0018 | 0.0018 |
| Average number $N_B$ of fibers: number | 1500 | 2400 | 2400 | 450 | 1500 | 700 | 6500 | 1500 |
| Proportion of carbon fiber bundle (Bb) | 86 Vol % | 95 Vol % | 95 Vol % | 40 Vol % | 86 Vol % | 86 Vol % | 86 Vol % | 86 Vol % |
| Average number $N(B)_{ave}$ of fibers: number | 1150 | 2000 | 2000 | 400 | 1150 | 600 | 6000 | 1150 |
| Density parameter $P_Y$ | 790 | 1818 | 1023 | 9089 | 3161 | 10651 | 151 | 126 |
| $P_X/P_Y$ | 0.50 | 0.22 | 0.39 | 0.04 | 0.79 | 0.008 | 2.63 | 3.14 |
| Evaluation of molding material | | | | | | | | |
| thickness Dt: mm | 3 | 3 | 3 | 3 | 3 | 3 | 3 | 3 |
| Tensile characteristics | | | | | | | | |
| Strength | 85 | 80 | 80 | 110 | 85 | 95 | 70 | 40 |
| Modulus | 90 | 85 | 85 | 110 | 90 | 90 | 75 | 40 |
| Bending characteristics | | | | | | | | |
| Strength | 95 | 90 | 90 | 110 | 95 | 95 | 80 | 50 |
| Modulus | 95 | 90 | 90 | 110 | 95 | 95 | 80 | 40 |
| Flow characteristic | | | | | | | | |
| Fluidity F | 500 | 550 | 600 | 120 | 500 | 350 | 1000 | 1400 |
| Outflow property of thermoplastic resin layer (X) | excellent | excellent | excellent | better | good | good | excellent | excellent |

\* Tensile characteristics, bending characteristics, and flow characteristic are represented as values relative to 100 of Comparative Example 1.

TABLE 3

| Sample name | Comparative Example 1 | Comparative Example 2 | Comparative Example 3 | Comparative Example 4 | Comparative Example 5 |
|---|---|---|---|---|---|
| Number of layers | 1 | 1 | 3 | 3 | 5 |
| Configuration | Y | X | Y/X/Y | Y/X/Y | Y/Y/X/Y/Y |
| Proportion of X layer (X/X + Y): wt % | 0 | 100 | 20 | 20 | 50 |
| X layer | | | | | |
| Single layer thickness: mm | — | 3 | 0.6 | 0.6 | 2.0 |
| Number-average fiber length $Ln_A$: mm | — | 0.22 | 4 | 0.22 | 0.22 |
| Weight-average fiber length $Lw_A$: mm | — | 0.55 | 4.2 | 0.55 | 0.55 |
| Carbon fiber volume fraction $Vf_A$: % | — | 35 | 35 | 35 | 15 |
| Thermoplastic resin | — | PA6 | PA6 | PA6 | PP |
| Carbon fiber areal weight: g/m² | — | 1878 | 376 | 376 | 250 |
| Sectional area of carbon fibers: mm² | — | 0.000038 | 0.000038 | 0.000038 | 0.000038 |
| Carbon fiber density ρf: g/mm³ | — | 0.0018 | 0.0018 | 0.0018 | 0.0018 |
| Average number $N_A$ of fibers: number | — | 1.1 | 1.1 | 1.1 | 1.1 |
| Density parameter $P_X$ | — | 398 | 131463 | 398 | 79 |
| Y layer | | | | | |
| Single layer thickness: mm | 3 | — | 1.2 | 1.2 | 0.5 |
| Number-average fiber length $Ln_B$: mm | 20 | — | 20 | 20 | 4.4 |
| Weight-average fiber length $Lw_B$: mm | 20 | — | 20 | 20 | 4.6 |
| Carbon fiber volume fraction ($Vf_B$): % | 35 | — | 35 | 35 | 20 |
| Thermoplastic resin | PA6 | — | PA6 | PA6 | PP |
| Carbon fiber areal weight: g/m² | 1889 | — | 756 | 756 | 180 |

TABLE 3-continued

| Sample name | Comparative Example 1 | Comparative Example 2 | Comparative Example 3 | Comparative Example 4 | Comparative Example 5 |
|---|---|---|---|---|---|
| Sectional area of carbon fibers: mm² | 0.000038 | — | 0.000038 | 0.000038 | 0.000038 |
| Carbon fiber density ρf: g/mm³ | 0.0018 | — | 0.0018 | 0.0018 | 0.0018 |
| Average number $N_B$ of fibers: number | 1500 | — | 1500 | 210 | 1.2 |
| Proportion of carbon fiber bundle (Bb) | 86 Vol % | — | 86 Vol % | 20 Vol % | — |
| Average number $N(B)_{ave}$ of fibers: number | 1150 | — | 1150 | 150 | 1.2 |
| Density parameter $P_Y$ | 3161 | — | 3161 | 24238 | 83843 |
| $P_X/P_Y$ | — | — | 41.6 | 0.016 | 0.0009 |
| Evaluation of molding material | | | | | |
| thickness Dt: mm | 3 | 3 | 3 | 3 | 4 |
| Tensile characteristics | | | | | |
| Strength | 100 | 30 | 95 | 115 | 70 |
| Modulus | 100 | 40 | 95 | 115 | 80 |
| Bending characteristics | | | | | |
| Strength | 100 | 50 | 95 | 115 | 90 |
| Modulus | 100 | 30 | 95 | 115 | 85 |
| Flow characteristic | | | | | |
| Fluidity F | 100 | 2000 | 100 | 70 | 800 |
| Outflow property of thermoplastic resin layer (X) | — | — | good | bad | — |

\* Tensile characteristics, bending characteristics, and flow characteristic are represented as values relative to 100 of Comparative Example 1.

INDUSTRIAL APPLICABILITY

In the molding material related to the present invention, since a weight-average fiber length of the carbon fibers (A) of the thermoplastic resin layer (X) is short, the flow characteristic during molding is improved, and since a weight-average fiber length of the carbon fibers (B) of the thermoplastic resin layer (Y) is large, the flow characteristic during molding and development of mechanical characteristics when formed as a molded article are compatible with each other. The molding material of the present invention can be widely applied as molding materials of, for example, inner plates, outer plates, and constituent members of automobiles, railway vehicles, and aircrafts, and frames or housings of various electrical parts, and machinery and devices.

The present invention has been described in detail with reference to the specific embodiments, but it is obvious to a person skilled in the art that various modifications or alterations may occur without departing from the spirit and the scope of the present invention.

This application is based upon and claims the benefit of priority from Japanese Patent Application No. 2014-017512, filed Jan. 31, 2014; the entire contents of which are incorporated herein by reference.

REFERENCE SIGNS LIST

1, 3, 5 MOLDING MATERIAL
A1 CARBON FIBER
B1 CARBON FIBER
C1 THERMOPLASTIC RESIN
E1 THERMOPLASTIC RESIN
X1 THERMOPLASTIC RESIN
Y1 THERMOPLASTIC RESIN

The invention claimed is:

1. A molding material for a multi-layered structure, comprising:
 a thermoplastic resin layer (X) including carbon fibers (A) having a weight-average fiber length of 0.01 mm to less than 3 mm; and
 a thermoplastic resin layer (Y) including carbon fibers (B) having a weight-average fiber length of 3 mm to 100 mm,
 wherein a density parameter $P_Y$ of the thermoplastic resin layer (Y) expressed by the following Equation (1) is $1 \times 10^2$ to less than $1 \times 10^4$, and
 wherein a density parameter $P_X$ of the thermoplastic resin layer (X) expressed by the following Equation (1) is more than $1 \times 10^1$:

$$P = (q \times Ln^3)/h \quad (1)$$

wherein q is the number of flow units of carbon fibers included in the thermoplastic resin layer per 1 mm² unit area;
 Ln is a number-average fiber length (mm) of the carbon fibers; and
 h is a thickness (mm) of the thermoplastic resin layer.

2. The molding material for a multi-layered structure according to claim 1, wherein a ratio ($P_X/P_Y$) of the density parameter $P_X$ of the thermoplastic resin layer (X) to the density parameter $P_Y$ of the thermoplastic resin layer (Y) is $1.0 \times 10^{-3}$ to 3.0.

3. The molding material for a multi-layered structure according to claim 1, wherein a weight proportion of the thermoplastic resin layer (X) to a total weight of the thermoplastic resin layer (X) and the thermoplastic resin layer (Y) is 5 wt % to 40 wt %.

4. The molding material for a multi-layered structure according to claim 1, wherein the thermoplastic resin layer (Y) is disposed in an outermost layer on at least one side of a multi-layered structure.

5. The molding material for a multi-layered structure according to claim 1, wherein the thermoplastic resin layer (X) is disposed at a center in at least a stacking direction.

6. The molding material for a multi-layered structure according to claim 5, wherein the thermoplastic resin layer (X) is a single layer, and the thermoplastic resin layer (Y) is of two layers.

7. The molding material for a multi-layered structure according to claim 1, wherein the carbon fibers (B) included in the thermoplastic resin layer (Y) are randomly oriented in two-dimensional directions.

8. The molding material for a multi-layered structure according to claim 1, wherein the carbon fibers (B) included in the thermoplastic resin layer (Y) include a carbon fiber bundle (Bb) constituted by single fibers of a critical number of single fiber or more, defined by the following Equation (2), a proportion of the carbon fiber bundle (Bb) to a total amount of the carbon fibers (B) is more than 0 Vol % and less than 99 Vol %, and an average number ($N_B$) of fibers in the carbon fiber bundle (Bb) satisfies the following Expression (3):

$$\text{Critical number of single fiber} = 600/D_B \quad (2)$$

$$0.7 \times 10^4/D_B^2 < N_B < 6 \times 10^5/D_B^2 \quad (3)$$

wherein $D_B$ is an average fiber diameter (μm) of the carbon fibers (B).

9. A molded article of a multi-layered structure, molded by molding a molding material, wherein the molding material is a molding material according to claim 1.

10. The molded article of a multi-layered structure according to claim 9, wherein the thermoplastic resin layer (Y) is present at an end of the molded article.

11. The molded article of a multi-layered structure according to claim 9, wherein the multi-layered structure is a structure having a molding layer of the thermoplastic resin layer (Y) located in an outermost layer on at least one side, and a molding layer of the thermoplastic resin layer (X) adjacent to the molding layer of the thermoplastic resin layer (Y), and wherein a protrusion portion is provided on a surface of the molding layer of the thermoplastic resin layer (Y), and a part of the molding layer of the thermoplastic resin layer (X) pushes up the molding layer of the thermoplastic resin layer (Y) at the protrusion portion in a direction in which the protrusion portion protrudes.

12. The molded article of a multi-layered structure according to claim 9, wherein the multi-layered structure is a structure having a molding layer of the thermoplastic resin layer (Y) located in an outermost layer on at least one side, and a molding layer of the thermoplastic resin layer (X) adjacent to the molding layer of the thermoplastic resin layer (Y), and wherein a protrusion portion is provided on a surface of the molding layer of the thermoplastic resin layer (Y), and a part of the molding layer of the thermoplastic resin layer (X) breaks through the molding layer of the thermoplastic resin layer (Y) at the protrusion portion in a direction in which the protrusion portion protrudes.

13. The molding material for a multi-layered structure according to claim 1, wherein a fiber volume fraction ($Vf_A$), defined by the following Equation (6), of the carbon fibers (A) in the thermoplastic resin layer (X) is within a range from 5 Vol % to 80 vol %:

$$Vf = 100 \times (\text{volume of carbon fibers})/(\text{volume of carbon fibers} + \text{volume of thermoplastic resin}) \quad (6).$$

14. The molding material for a multi-layered structure according to claim 1, wherein a fiber volume fraction ($Vf_A$), generally defined by the following Equation (6), of the carbon fibers (A) in the thermoplastic resin layer (X) is within a range from 20 Vol % to 60 vol %:

$$Vf = 100x(\text{volume of carbon fibers})/(\text{volume of carbon fibers} + \text{volume of thermoplastic resin}) \quad (6).$$

15. The molding material for a multi-layered structure according to claim 1, wherein a weight proportion of the thermoplastic resin layer (X) to the total weight of the thermoplastic resin layer (X) and the thermoplastic resin layer (Y) is within a range from 10 wt % to 35 wt %.

16. The molding material for a multi-layered structure according to claim 1, wherein the thermoplastic resin layers (Y) are provided in both of the outermost layers in the stacking direction of the molding material.

17. The molding material for a multi-layered structure according to claim 1, wherein the thermoplastic resin layer (X) and the thermoplastic resin layer (Y) directly contact with each other.

* * * * *